US012080968B2

(12) United States Patent
Kobayashi

(10) Patent No.: US 12,080,968 B2
(45) Date of Patent: Sep. 3, 2024

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hiroki Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 332 days.

(21) Appl. No.: 17/767,038

(22) PCT Filed: Aug. 4, 2020

(86) PCT No.: PCT/JP2020/029773

§ 371 (c)(1),
(2) Date: Apr. 6, 2022

(87) PCT Pub. No.: WO2021/079587

PCT Pub. Date: Apr. 29, 2021

(65) Prior Publication Data

US 2022/0376428 A1 Nov. 24, 2022

(30) Foreign Application Priority Data

Oct. 24, 2019 (JP) ................................ 2019-193603

(51) Int. Cl.

| | |
|---|---|
| ***H01R 13/514*** | (2006.01) |
| ***H01R 13/506*** | (2006.01) |
| *H01R 31/08* | (2006.01) |

(52) U.S. Cl.
CPC ......... *H01R 13/514* (2013.01); *H01R 13/506* (2013.01); *H01R 31/085* (2013.01)

(58) Field of Classification Search
CPC .. H01R 13/514; H01R 13/506; H01R 31/085; H01R 13/6272; H01R 2107/00; H01R 2201/26; H01R 9/11
See application file for complete search history.

(56) References Cited

U.S. PATENT DOCUMENTS 5,122,077 A * 6/1992 Maejima .............. H01R 13/514 439/701
5,154,630 A * 10/1992 Kamono ............ H01R 13/6272 439/352

(Continued)

FOREIGN PATENT DOCUMENTS

JP 2000-150087 A 5/2000
JP 2003-331942 A 11/2003

(Continued)

OTHER PUBLICATIONS

International Search Report issued on Nov. 2, 2020 for WO 2021/079587 A1 (4 pages).

*Primary Examiner* — Travis S Chambers
(74) *Attorney, Agent, or Firm* — Venjuris, P.C.

(57) ABSTRACT

A joint connector 10 is provided with connecting members 21 each including a plurality of terminals 12 and a conductive member, and a plurality of housings. The plurality of housings are stacked along a stacking direction. At least one housing constituting the plurality of housings includes a placing portion, on which the connecting member 21 is placed, and a lid portion for at least partially covering the connecting member 21 placed on the placing portion to hold the connecting member 21 in the housing. A first housing 71 and a second housing 171 are stacked on each other. A first lid portion relating to the first housing 71 and a second lid (Continued)

portion relating to the second housing 171 are provided with a stacked state holding portion.

9 Claims, 17 Drawing Sheets

(56) References Cited

U.S. PATENT DOCUMENTS

| | | | | |
|---|---|---|---|---|
| 7,186,151 | B2 * | 3/2007 | Komiyama ........ | H01R 13/5829 439/492 |
| 2002/0076990 | A1 * | 6/2002 | Fujita .................. | H01R 13/514 439/701 |
| 2002/0123272 | A1 | 9/2002 | Yoshida et al. | |
| 2009/0042445 | A1 | 2/2009 | Ichio et al. | |
| 2020/0373702 | A1 | 11/2020 | Ebata et al. | |

FOREIGN PATENT DOCUMENTS

| | | |
|---|---|---|
| JP | 2007-012395 A | 1/2007 |
| JP | 2013-093226 A | 5/2013 |

* cited by examiner

JOINT CONNECTOR

CROSS REFERENCE TO RELATED APPLICATIONS

This application is a national phase of PCT application No. PCT/JP2020/029773, filed on 4 Aug. 2020, which claims priority from Japanese patent application No. 2019-193603, filed on 24 Oct. 2019, all of which are incorporated herein by reference.

TECHNICAL FIELD

The present disclosure relates to a joint connector.

BACKGROUND

A joint connector shown in Patent Document 1 is, for example, known as a conventional joint connector. This joint connector includes sub-housings stackable in a plurality of stages and a plurality of terminal fittings to be accommodated into the respective sub-housings. Four deflectable locking pieces projecting upward are provided on the upper surface of the sub-housing. Further, the sub-housing is provided with locked portions to be locked by the deflectable locking pieces of the sub-housing located below. In this way, the respective sub-housings are held in a stacked state.

PRIOR ART DOCUMENT

Patent Document

Patent Document 1: JP 2009-043642 A

SUMMARY OF THE INVENTION

Problems to be Solved

For example, in a very small joint connector used in a vehicle or the like, a sub-housing including a terminal accommodating portion on which terminal fittings connected to a busbar and wires are placed and a lid portion to be mounted to cover the placed terminal fittings is considered as a virtual technique. In the case of stacking such sub-housings, the lid portion of the upper sub-housing may be detached, for example, when a stress is applied to the lid portion of the upper sub-housing, for example, if the lid portion of the lower sub-housing is provided with locking pieces and the terminal accommodating portion of the upper sub-housing is provided with locked portions.

The technique disclosed in this specification was completed on the basis of the above situation and aims to provide a joint connector capable of holding sub-housings in a stacked state even if a lid portion is mounted on a terminal accommodating portion.

Means to Solve the Problem

The present disclosure is directed to a joint connector with connecting members each including a plurality of terminals to be connected to wires and a conductive member for making the plurality of terminals conductive with each other, and a plurality of housings for respectively accommodating the connecting members, wherein the plurality of housings are stacked along a stacking direction, at least one housing constituting the plurality of housings includes a placing portion, the connecting member being placed on the placing portion, and a lid portion for at least partially covering the connecting member placed on the placing portion to hold the connecting member in the housing, a first housing serving as one of the housings and a second housing serving as one of the housings are stacked on each other, and a first lid portion serving as the lid portion relating to the first housing and a second lid portion serving as the lid portion relating to the second housing are provided with a stacked state holding portion for holding a stacked state of the first and second housings.

Effect of the Invention

According to the present disclosure, it is possible to hold a plurality of housings in a stacked state.

DETAILED DESCRIPTION TO EXECUTE THE INVENTION

Description of Embodiments of Present Disclosure

Figure 1:
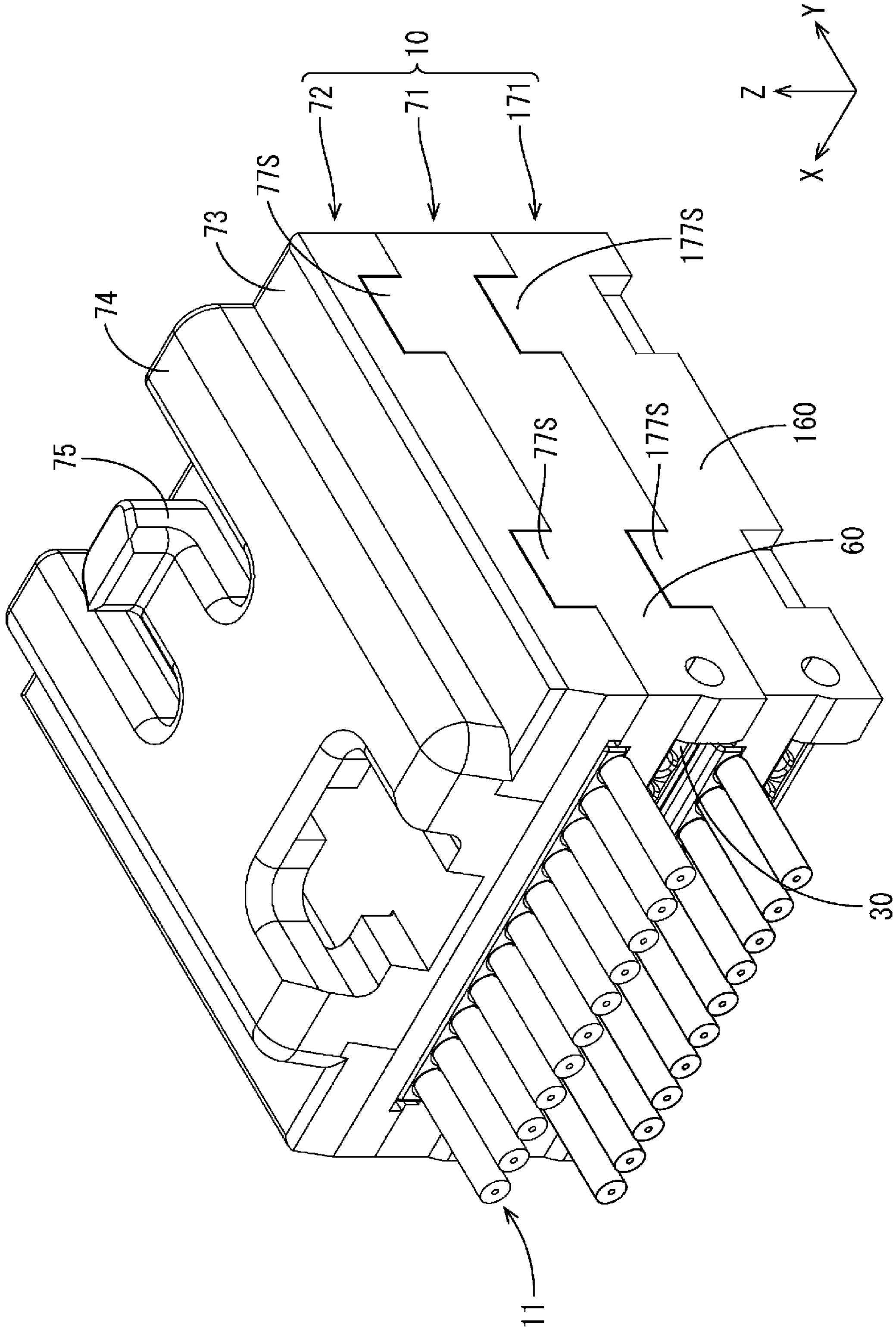
FIG. 1 is a rear perspective view of a joint connector in an embodiment.

First, embodiments of the present disclosure are listed and described.

(1) The present disclosure is directed to a joint connector with connecting members each including a plurality of terminals to be connected to wires and a conductive member for making the plurality of terminals conductive with each other, and a plurality of housings for respectively accommodating the connecting members, wherein the plurality of housings are stacked along a stacking direction, at least one housing constituting the plurality of housings includes a placing portion, the connecting member being placed on the placing portion, and a lid portion for at least partially covering the connecting member placed on the placing portion to hold the connecting member in the housing, a first housing serving as one of the housings and a second housing serving as one of the housings are stacked on each other, and a first lid portion serving as the lid portion relating to the first housing and a second lid portion serving as the lid portion relating to the second housing are provided with a stacked state holding portion for holding a stacked state of the first and second housings.

By providing the first lid portion of the first housing and the second lid portion of the second housing with the stacked state holding portion for holding the stacked state, the first lid portion is not detached and the stacked state of the first and second housings can be held since the first and second lid portions are held by the stacked state holding portion even if a stress is applied to the first lid portion of the first housing, for example, as compared to a configuration in which only the second lid portion of the second housing and the placing portion of the first housing are provided with a stacked state holding portion, for example, in the case of stacking the first housing on the second housing.

Further, since the first housing can be held stacked on the second housing, the respective housings in the joint connector can be collectively fixed by one taping, for example, in the case of fixing the joint connector to a harness by a harness tape as compared to a configuration in which the first and second housings are not stacked. Further, the joint connector can be fixed to a mating member by one fixing member, for example, in the case of mounting the fixing member on the housing and fixing the fixing member to the mating member. Therefore, the joint connector can be fixed using a smaller number of types of components as compared to a configuration in which each of the first and second housings is provided with a fixing member.

(2) Preferably, the terminal includes a wire connecting portion to be connected to the wire, and the lid portion includes a bending/drawing-out portion for bending the wires extending in a first direction from the wire connecting portions of the terminals to extend in a second direction shifted from the first direction and drawing out the wires to outside of the housing.

The wires can be bent and drawn out and a holding force for the wires can be strengthened by providing the lid portion with the bending/drawing-out portion for bending the wires.

(3) Preferably, the lid portion is mounted on the placing portion from one side in the stacking direction, and the lid portion is provided with a locking portion for suppressing a displacement of the lid portion in a direction away from the placing portion by contacting a locked portion of the placing portion from the other side in the stacking direction.

By providing the lid portion with the locking portion and providing the placing portion with the locked portion, the detachment of the lid portion from the placing portion can be suppressed.

(4) Preferably, the stacked state holding portion includes a lock portion having a lock projection and extending from the second lid portion toward the first lid portion, and a lock recess provided in the first lid portion and to be fit to the lock projection, and the first and second housings are held in the stacked state by fitting the lock projection and the lock recess.

By providing the second lid portion with the lock portion having the lock projection and providing the first lid portion with the lock recess to be fit to the lock projection, the first and second housings can be held in the stacked state.

(5) Preferably, the stacked state holding portion includes a lock portion having a lock projection and extending from the second lid portion toward the placing portion relating to the first housing, and a lock recess provided in the placing portion relating to the first housing and to be fit to the lock projection, and the first and second housings are held in the stacked state by fitting the lock projection and the lock recess.

By providing the second lid portion with the lock portion having the lock projection and providing the placing portion with the lock recess to be fit to the lock projection, the first and second housings can be held in the stacked state not only between the lid portions (first and second lid portions), but also between the placing portion and the second lid portion. In this way, a holding force for holding the first and second housings in the stacked state can be further strengthened.

(6) Preferably, the first and second housings include facing wall portions facing each other, the stacked state holding portion includes a first fitting portion provided on the facing wall portion of the first housing and a second fitting portion provided on the facing wall portion of the second housing and to be fit to the first fitting portion, and the first housing is suppressed from being displaced in a direction intersecting the stacking direction with respect to the second housing by fitting the first and second fitting portions.

By respectively providing the first and second fitting portions on the facing wall portions of the first and second housings, the first housing can be suppressed from being displaced in the direction intersecting the stacking direction with respect to the second housing.

(7) Preferably, a fixing member is provided which is fixed to a mating member and stacked on the first lid portion, the stacked state holding portion includes a lock portion having a lock projection and extending from the first lid portion to the fixing member, and a lock recess provided in the fixing member and to be fit to the lock projection, and the fixing member and the first housing are held in a stacked state by fitting the lock projection and the lock recess.

Since the fixing member to be fixed to the mating member is stacked and held on the first lid portion, the joint connector can be fixed to the mating member by one fixing member.

(8) Preferably, the fixing member and the first housing include facing wall portions facing each other, the stacked state holding portion includes a first fitting portion provided on the facing wall portion of the fixing member and a second fitting portion provided on the facing wall portion of the first housing and to be fit to the first fitting portion, and the fixing member is suppressed from being displaced in a direction intersecting a stacking direction of the fixing member and the first housing with respect to the first housing by fitting the first and second fitting portions.

By respectively providing the first and second fitting portions on the facing wall portions of the fixing member and the first housing, the fixing member can be suppressed from being displaced in the direction intersecting the stacking direction with respect to the first housing.

(9) Preferably, the terminal includes a terminal body having a sandwiching portion for sandwiching the wire, a slide portion slidable with respect to the terminal body along an extending direction of the wire and a wire connecting portion to be connected to the wire, the slide portion includes a pressurizing portion for pressurizing the sandwiching portion toward the wire, and the wire connecting portion projects from the sandwiching portion toward the wire and contacts the wire to be connected.

Since the terminal can be connected to the wire, for example, even if the wire is a very thin single-core wire, the terminal can be reduced in size in accordance with the size of the wire. The use of the terminals having such a configuration can contribute to a size reduction of the joint connector.

Details of Embodiment of Present Disclosure

Hereinafter, an embodiment of the present disclosure is described. The present disclosure is not limited to these illustrations and is intended to be represented by claims and include all changes in the scope of claims and in the meaning and scope of equivalents.

Embodiment

One embodiment of the present disclosure is described with reference to FIGS. 1 to 17. In the following description, a direction indicated by an arrow Z is referred to as an upward direction, a direction indicated by an arrow Y is referred to as a forward direction, and a direction indicated by an arrow X is referred to as a leftward direction. Note that, for a plurality of identical members, only some members may be denoted by a reference sign and the other members may not be denoted by the reference sign.

[Joint Connector 10]

As shown in FIG. 1, a joint connector 10 according to this embodiment is a stack connector in which two (one example of a plurality of) housings are stacked along a vertical direction (an example of a stacking direction). The joint connector 10 includes a second housing 171 (an example of a housing), a first housing 71 (an example of the housing) to be stacked atop the second housing 171, and a fixing member 72 to be stacked atop the first housing 71.

Figure 4:
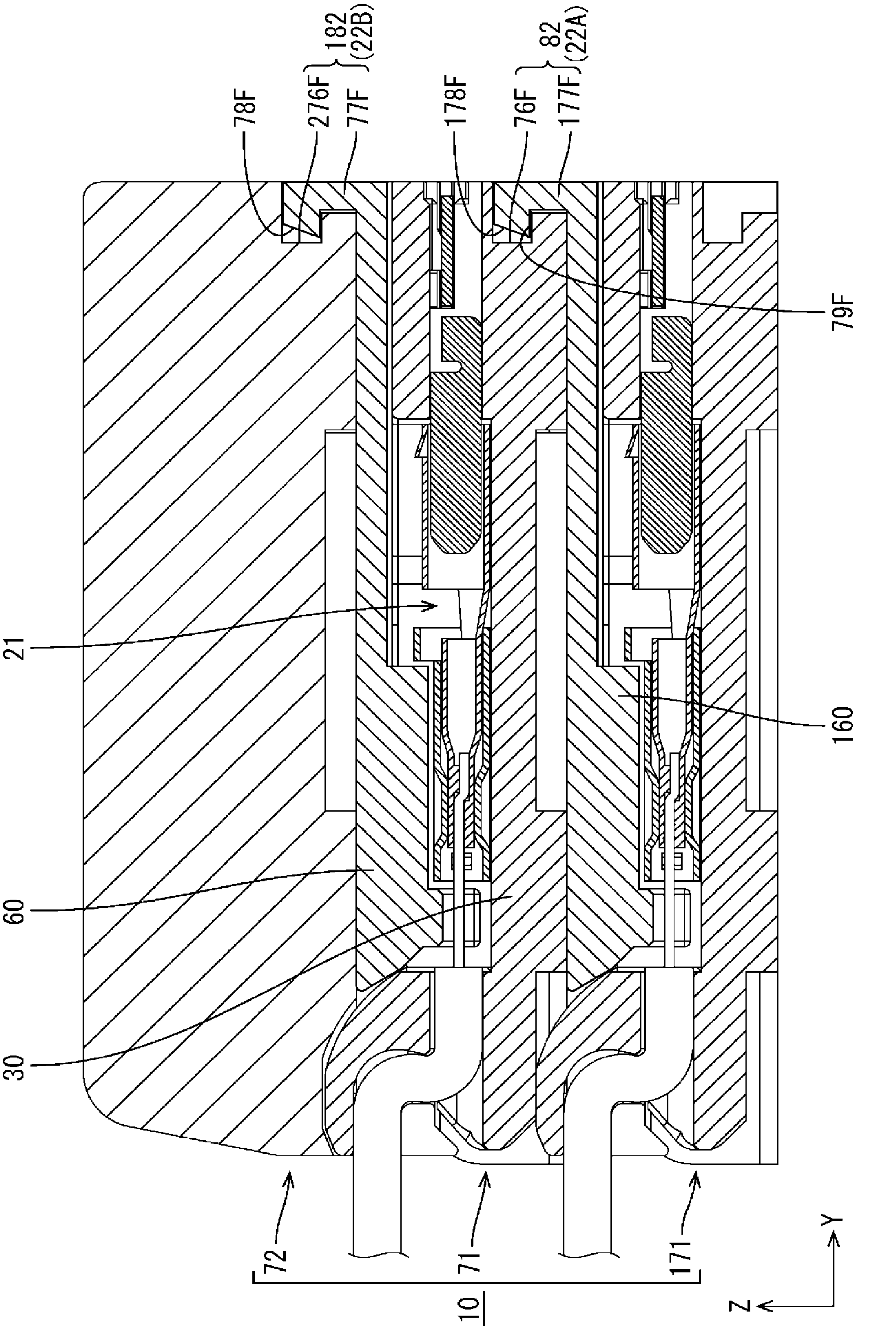
FIG. 4 is a section along B-B in FIG. 2.
Figure 5:
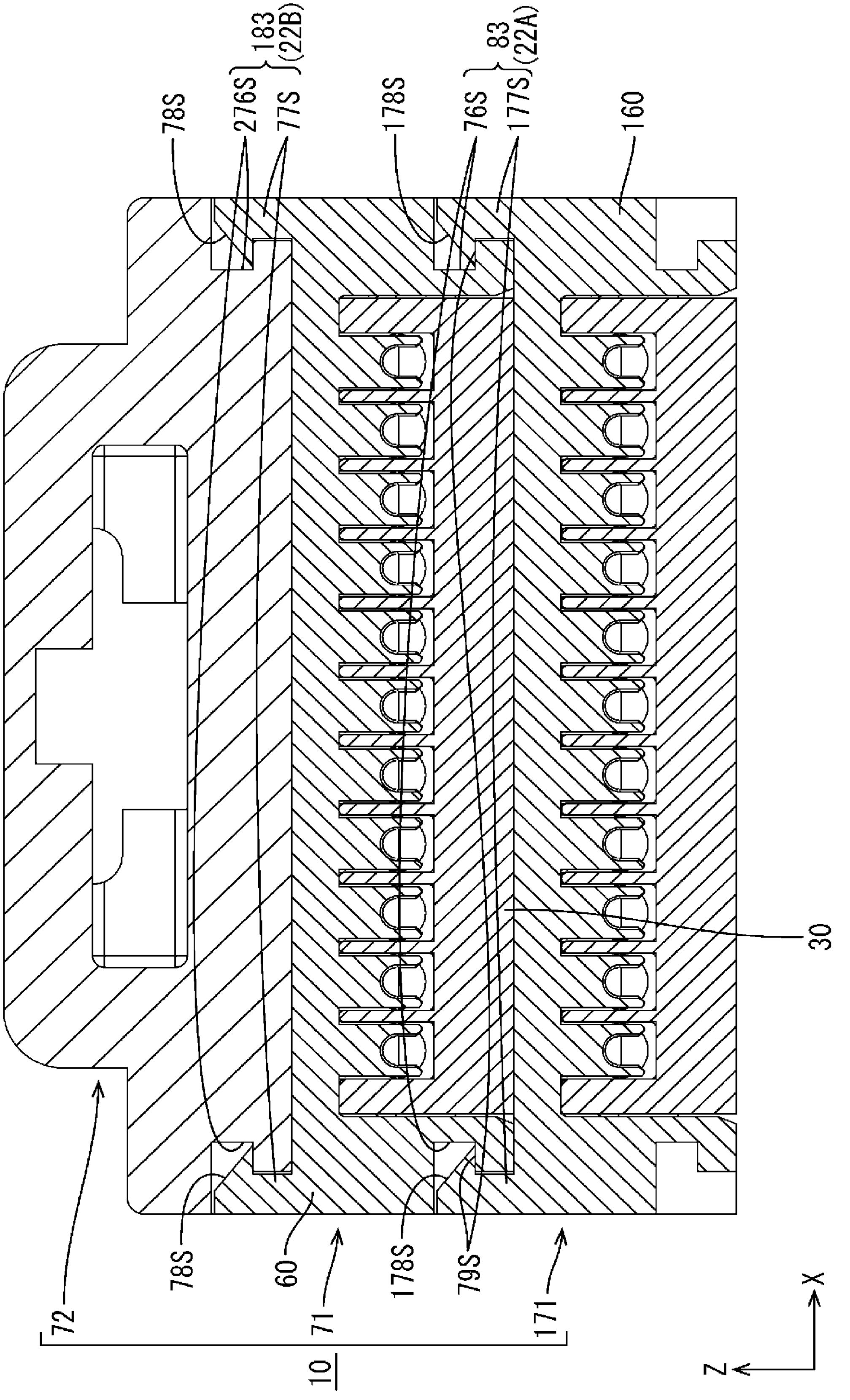
FIG. 5 is a section along C-C in FIG. 2.
Figure 6:
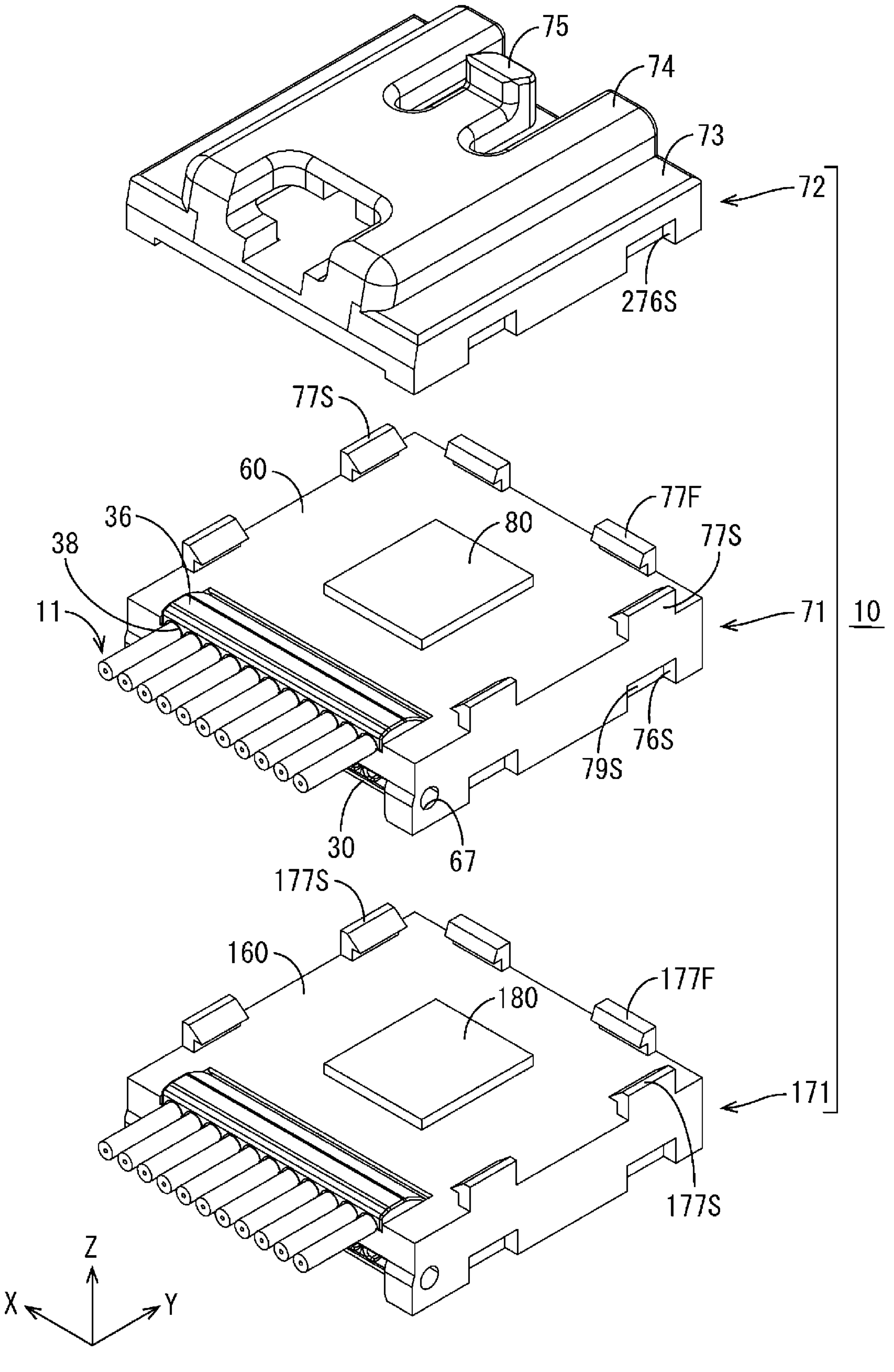
FIG. 6 is an exploded perspective view of the joint connector.

As shown in FIGS. 4 and 5, a stacked state of the first and second housings 71, 171 is held by a first stacked state holding portion 22A (an example of a stacked state holding portion). Further, a stacked state of the fixing member 72 and the first housing 71 is held by a second stacked state holding portion 22B (an example of the stacked state holding portion).

[First Housing 71, Second Housing 171]

Since each housing (first housing 71 and second housing 171) has a common configuration, the configuration of the first housing 71 on an upper side is mainly described.

Figure 3:
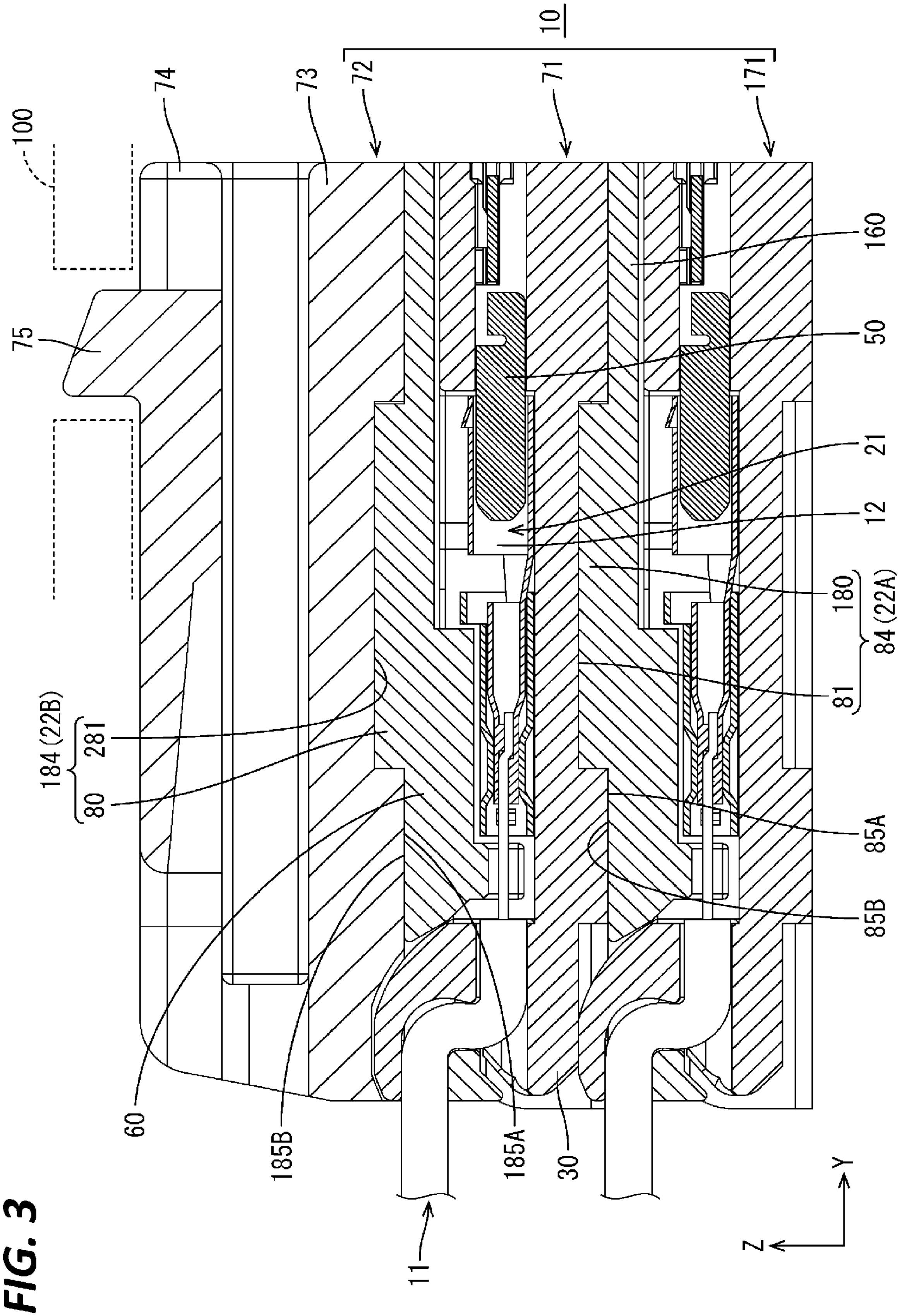
FIG. 3 is a section along A-A in FIG. 2.
Figure 11:
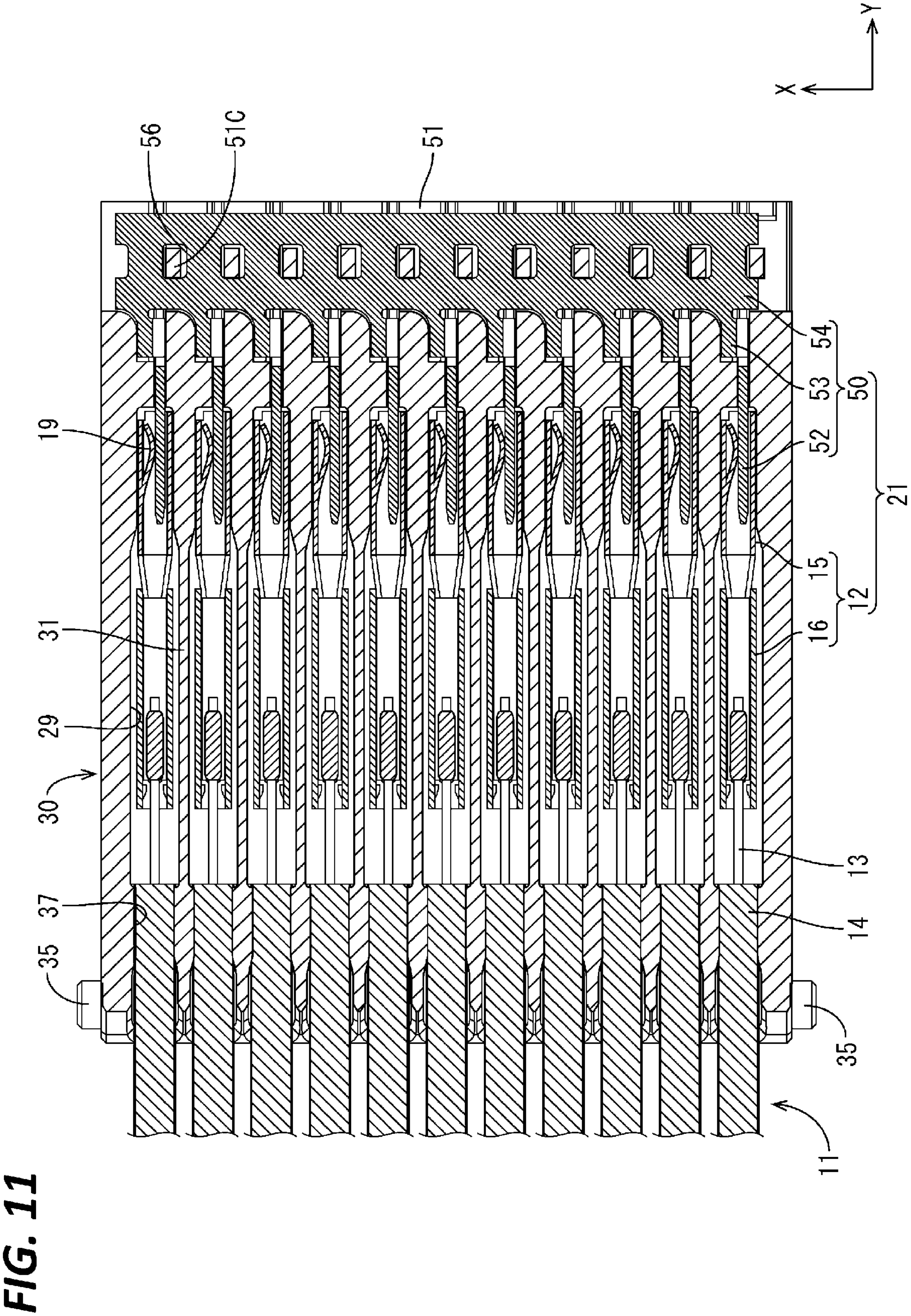
FIG. 11 is a section along D-D in FIG. 10.

As shown in FIG. 3, a connecting member 21 is accommodated in the first housing 71. As shown in FIG. 11, the connecting member 21 includes a plurality of terminals 12 to be respectively connected to front end parts of a plurality of wires 11 in a front-rear direction (an example of an extending direction) and a busbar 50 (an example of a conductive member) connected to the plurality of terminals 12 to make the plurality of terminals 12 conductive with each other.

Figure 7:
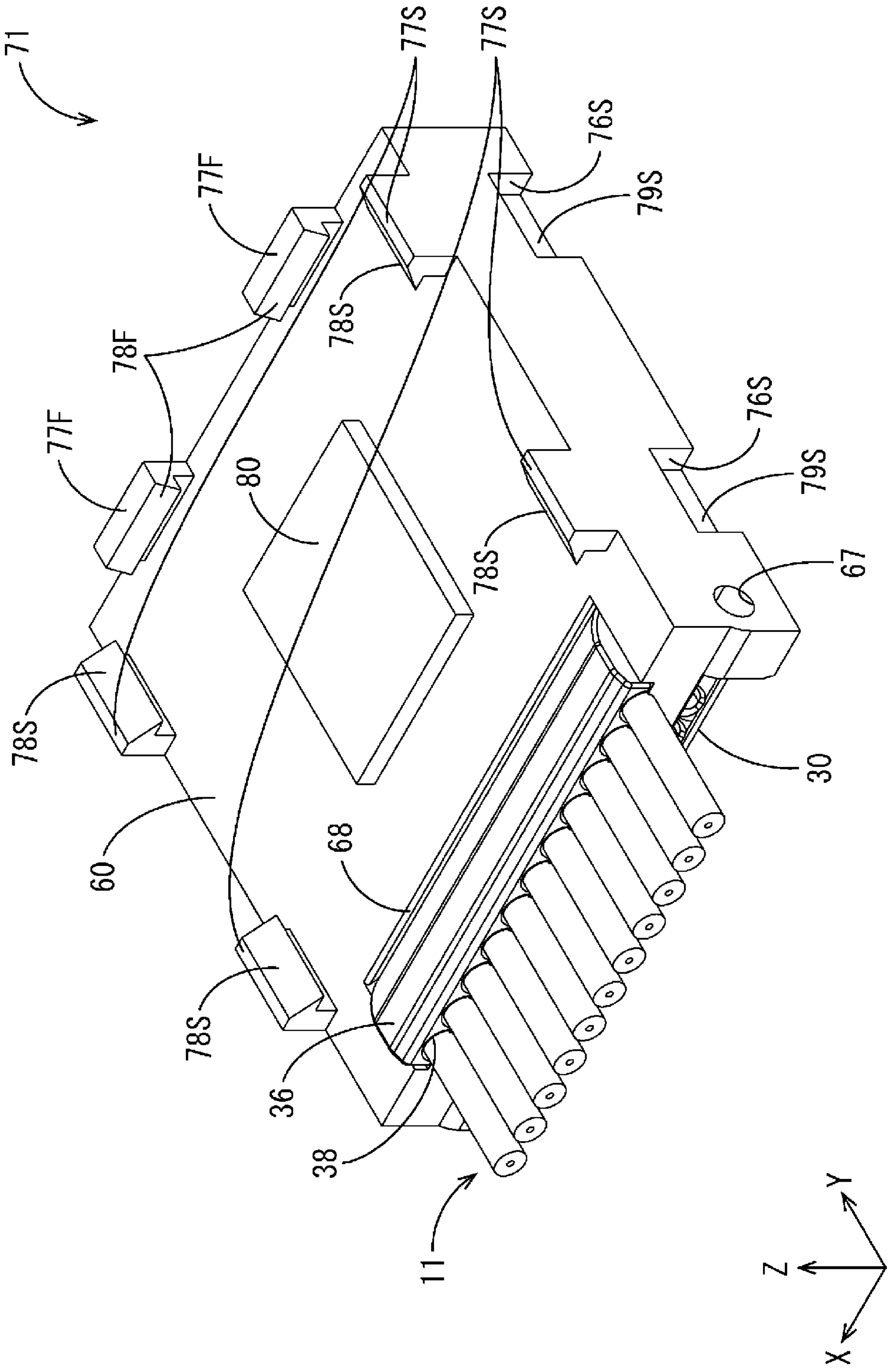
FIG. 7 is a rear perspective view of a first housing.
Figure 8:
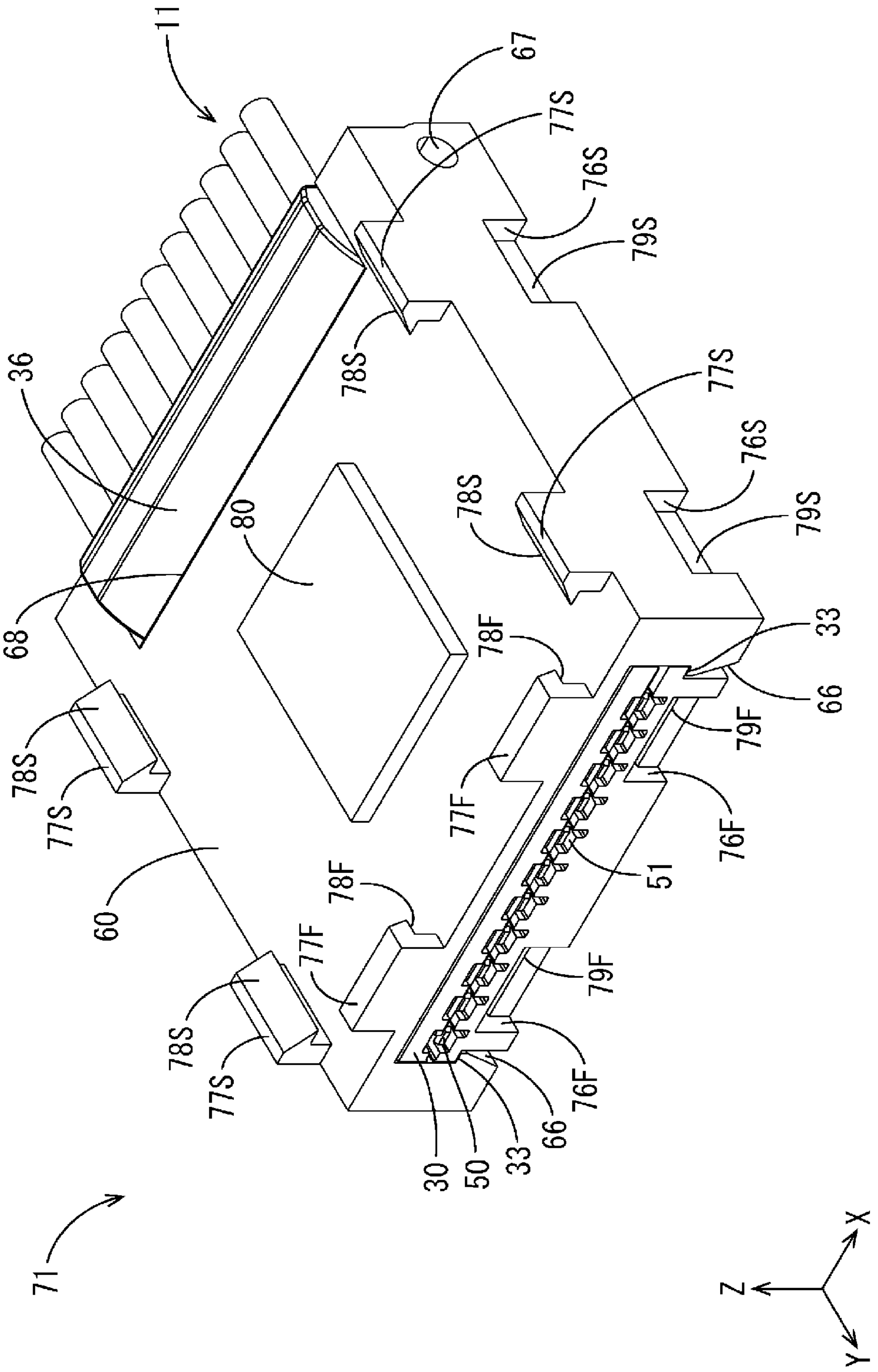
FIG. 8 is a front perspective view of the first housing.
Figure 9:
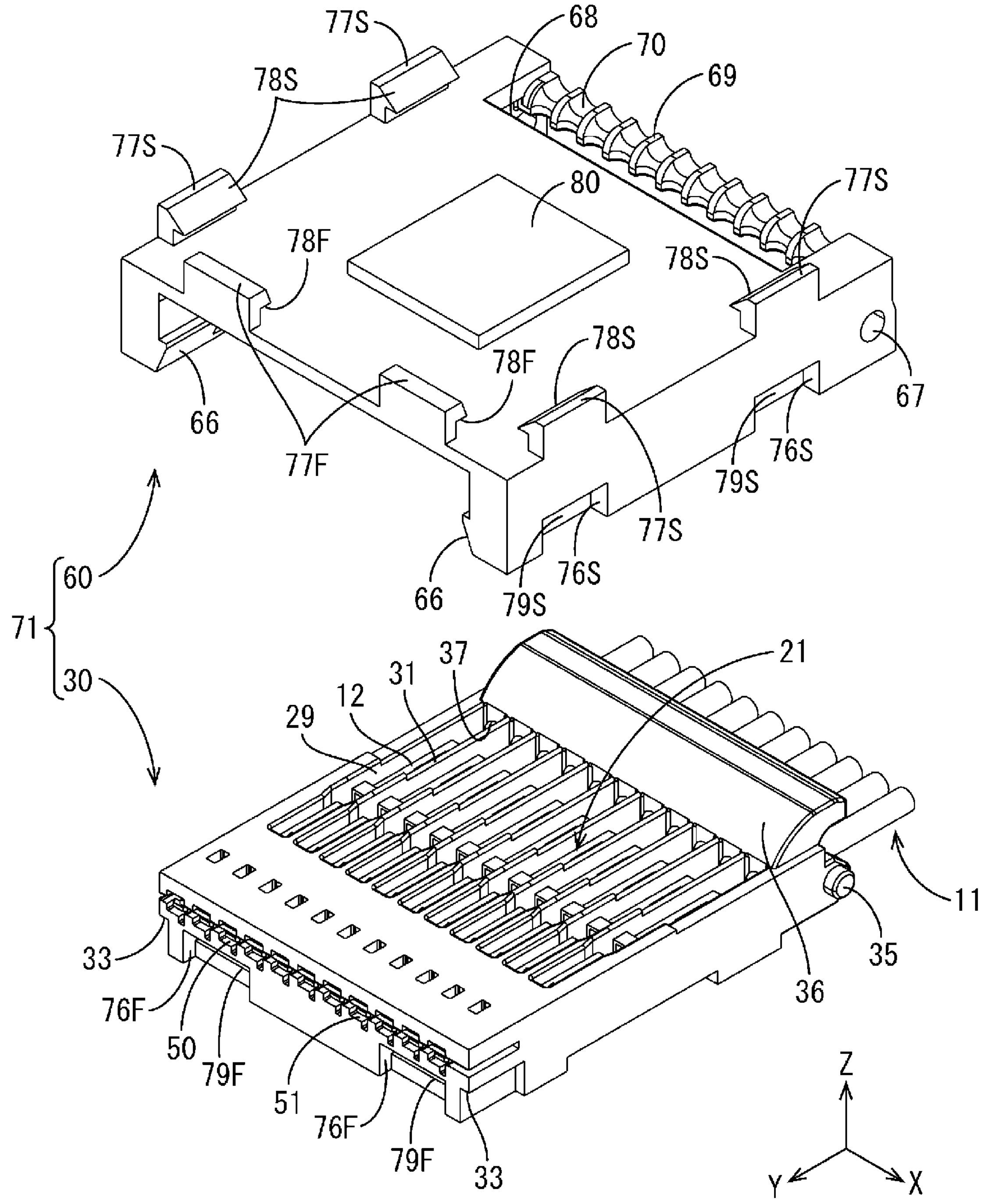
FIG. 9 is a front perspective view of the first housing in a state before an upper cover is assembled.
Figure 10:
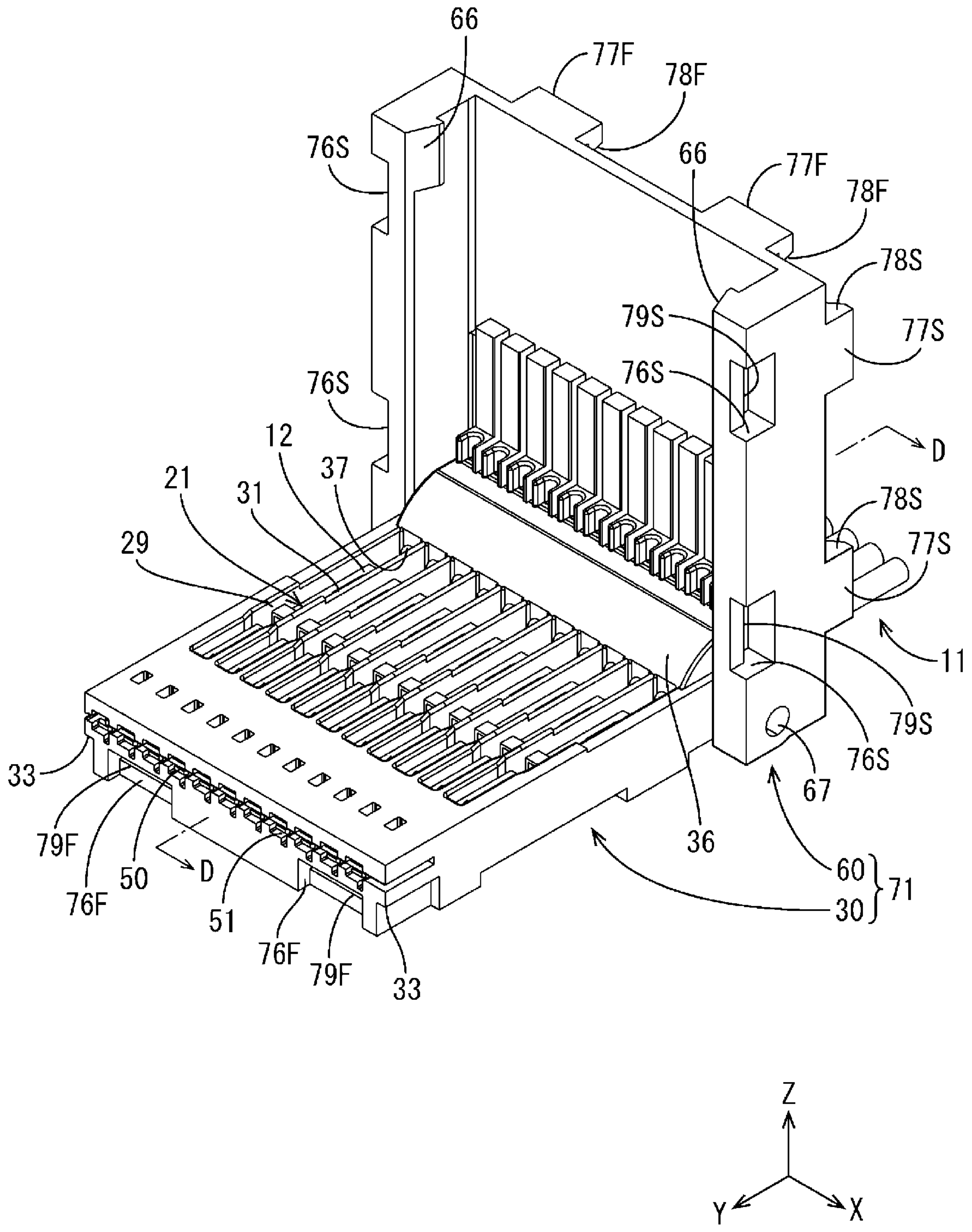
FIG. 10 is a front perspective view of the first housing in a state where the upper cover is located at an open position.

As shown in FIGS. 7 and 8, the first housing 71 has a rectangular parallelepiped shape extending in the front-rear direction. As shown in FIGS. 9 and 10, the first housing 71 includes a lower housing 30 (an example of a placing portion) on which the connecting member 21 is placed and an upper cover 60 (an example of a lid portion, first lid portion) to be mounted on the lower housing 30 from above.

[Wires 11]

Figure 15:
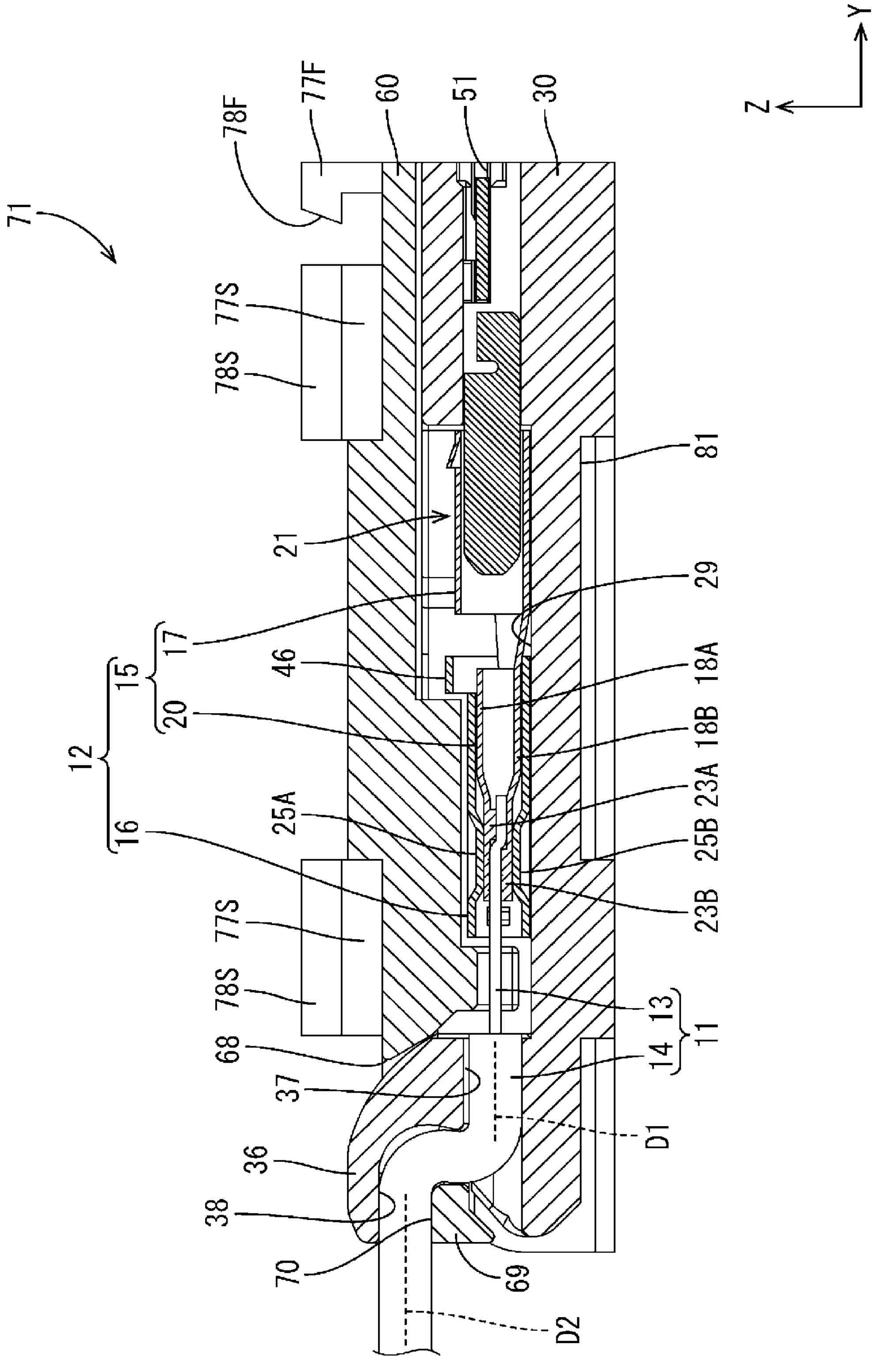
FIG. 15 is a section of the first housing after the completion of the assembling.

As shown in FIG. 15, the wire 11 is routed to extend in the front-rear direction (an example of an extending direction of the wire 11) and the front-rear direction is defined as the extending direction of the wire 11. The wire 11 is configured such that the outer periphery of a core 13 is surrounded with an insulation coating 14 made of insulating synthetic resin. The core 13 according to this embodiment is formed of one metal wire. Note that the core 13 may be a stranded wire formed by twisting a plurality of metal strands. An arbitrary metal such as copper, copper alloy, aluminum and aluminum alloy can be appropriately selected as a metal constituting the core 13 if necessary. The core 13 according to this embodiment is made of copper or copper alloy.

[Lower Housing 30]

As shown in FIGS. 9 and 10, the lower housing 30 is shaped to extend in the front-rear direction and be flat in a vertical direction. The lower housing 30 is formed by injection molding an insulating synthetic resin. The lower housing 30 is formed with a plurality of cavities 29 extending in the front-rear direction and arranged in a lateral direction. The cavities 29 are open upward, so that the terminals 12 are arranged into the cavities 29 from above. The cavities 29 adjacent to each other in the lateral direction are partitioned by partition walls 31 extending in the front-rear direction. The terminals 12 arranged in the respective cavities 29 are electrically insulated by these partition walls 31.

A busbar insertion hole 51 through which the busbar 50 is inserted into the cavities 29 from front is provided to be open long in the lateral direction in the front wall of the lower housing 30.

A pair of left and right lock receiving portions 33 (an example of a locked portion) are provided on front end parts of left and right side walls of the lower housing 30. As shown in FIG. 8, a pair of left and right lock claws 66 (an example of a locking portion) of the upper cover 60 to be described later are respectively locked to the lock receiving portions 33.

As shown in FIG. 9, a shaft portion 35 projecting outward is formed at a position near a rear end part on each side wall of the lower housing 30. The shaft portion 35 has a cylindrical shape.

Figure 12:
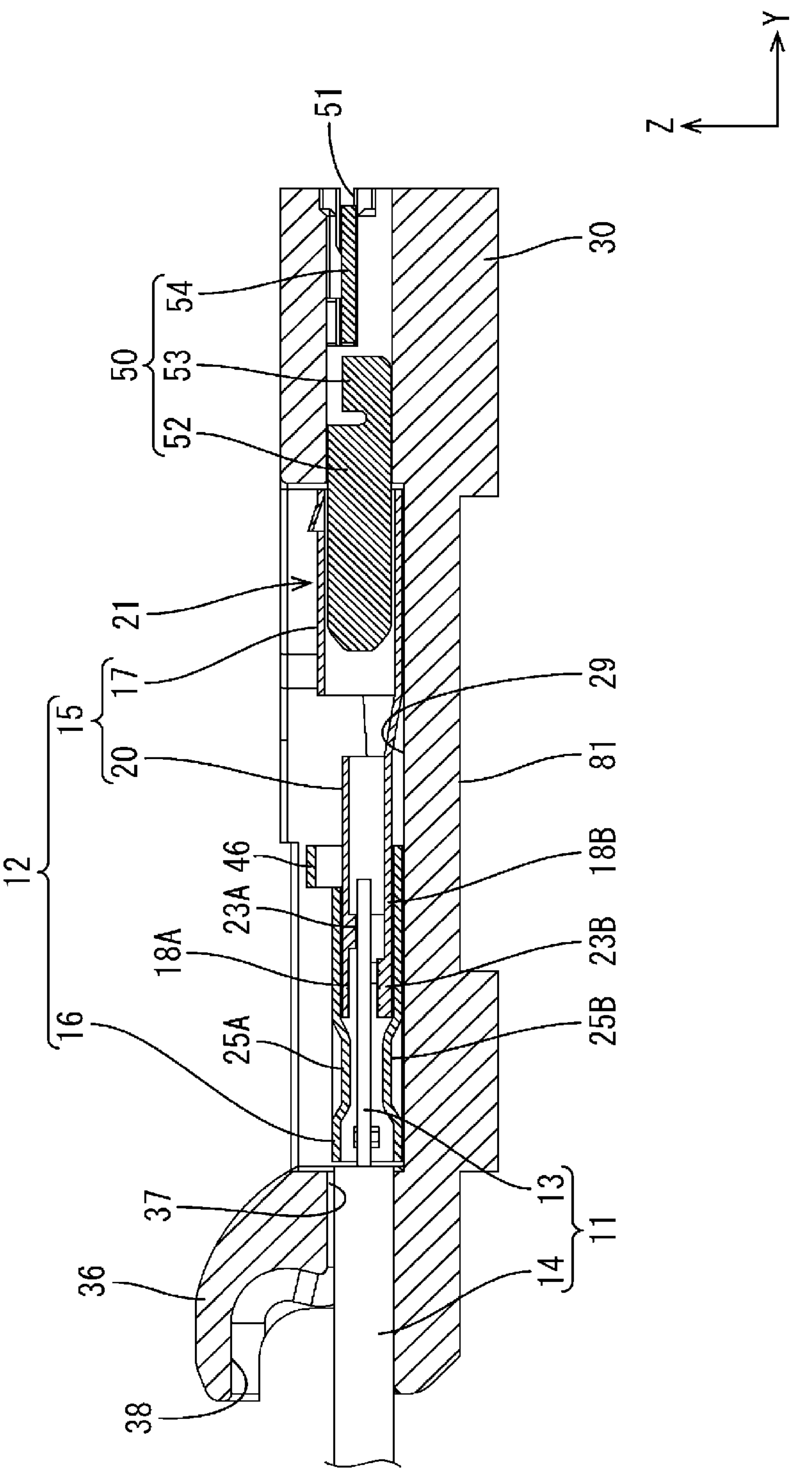
FIG. 12 is a section showing an assembling process of the first housing.

A lower guide portion 36 is formed on a rear end part of the lower housing 30. The lower guide portion 36 is provided in proximity to the shaft portions 35 at a position above the shaft portions 35. As shown in FIG. 12, the lower guide portion 36 is formed with a plurality of wire insertion holes 37 penetrating in the front-rear direction and arranged in the lateral direction. An inner diameter of the wire insertion hole 37 is equal to or larger than an outer diameter of the wire 11. Each cavity 29 is located in front of each wire insertion hole 37. The wire 11 is inserted into each wire insertion hole 37, thereby being positioned with respect to the lower housing 30.

As shown in FIG. 12, a front half of the lower guide portion 36 is formed into a curved surface shape from a front part to a top part of the lower guide portion 36. A rear half of the lower guide portion 36 is formed to project rearward from the rear end of the lower housing 30. The upper surface of the rear half of the lower guide portion 36 is a flat surface extending in the front-rear direction. In a rear end part of the lower guide portion 36, the upper surface of the lower guide portion 36 is inclined downward.

A region of the lower guide portion 36 behind a part where the wire insertion holes 37 are formed serves as a lower contact portion 38 having an upwardly concave curved surface shape. As shown in FIG. 15, with the upper cover 60 to be described later assembled with the lower housing 30, the lower contact portion 38 is in contact with upper parts of the wires 11 to arrange the wires 11 along the lower contact portion 38. The lower contact portion 38 is shaped to extend rearward along a gentle curve after being recessed to rise upward in an opening behind the wire insertion holes 37.

[Upper Cover 60]

As shown in FIGS. 8 and 9, the lower housing 30 has an upper part (at least a part of the connecting member 21) covered by the upper cover 60 assembled from above. The upper cover 60 is formed by injection molding an insulating synthetic resin. The pair of left and right lock claws 66 are formed to project downward on front end parts of the side walls of the upper cover 60. The lock claws 66 are located to be able to contact the lock receiving portions 33 provided on the side walls of the lower housing 30 from below (an example of the other side in the stacking direction). In this way, the upper cover 60 is suppressed from being displaced upward (an example of an away direction) from the lower housing 30. In this way, the lower housing 30 and the upper cover 60 are integrally assembled.

Shaft holes 67 to be fit to the shaft portions 35 of the lower housing 30 are formed in a rear end part of the upper cover 60. As shown in FIGS. 9 and 10, the upper cover 60 is rotatably assembled with the lower housing 30 with the shaft portions 35 as an axis of rotation by fitting the shaft holes 67 to the shaft portions 35.

The upper cover 60 is rotatable between an open position (position shown in FIGS. 10 and 14) where the upper cover 60 is assembled with the lower housing 30 with the upper surface of the lower housing 30 released and a closed position (position shown in FIGS. 8 and 15) where the upper surface of the lower housing 30 is closed.

As shown in FIG. 9, an opening 68 through which the wires 11 are drawn out is open upward in a rear end part of the upper wall of the upper cover 60. An upper guide portion 69 (an example of a bending/drawing-out portion) extending in the lateral direction in the opening 68 is formed in a rear end part of the upper cover 60. The upper guide portion 69 is provided in proximity to the shaft holes 67 at a position above the shaft holes 67. The upper guide portion 69 is formed with an upper contact portion 70. The upper contact portion 70 is shaped such that a plurality of U-shaped grooves are arranged in the lateral direction. The respective wires 11 are accommodated into U-shaped groove parts of the upper contact portion 70.

As shown in FIG. 15, the lower surface of the wire 11 is in contact with the upper contact portion 70 and the wire 11 is arranged along the upper contact portion 70. The wire 11 extending in a first direction D1 extending from between an upper holding protrusion 23A and a lower holding protrusion 23B of the terminal 12 is cranked to extend in a second direction D2 shifted from the first direction D1, and is drawn out to the outside of the first housing 71.

A part of the lower guide portion 36 from the upper surface to the front surface described above is shaped along a moving path of a front end part of the opening 68 of the upper cover 60 from the open position to the closed position. In this way, the interference of the upper cover 60 and the lower housing 30 can be suppressed when the upper cover 60 moves from the open position to the closed position.

[Busbar 50]

Figure 17:
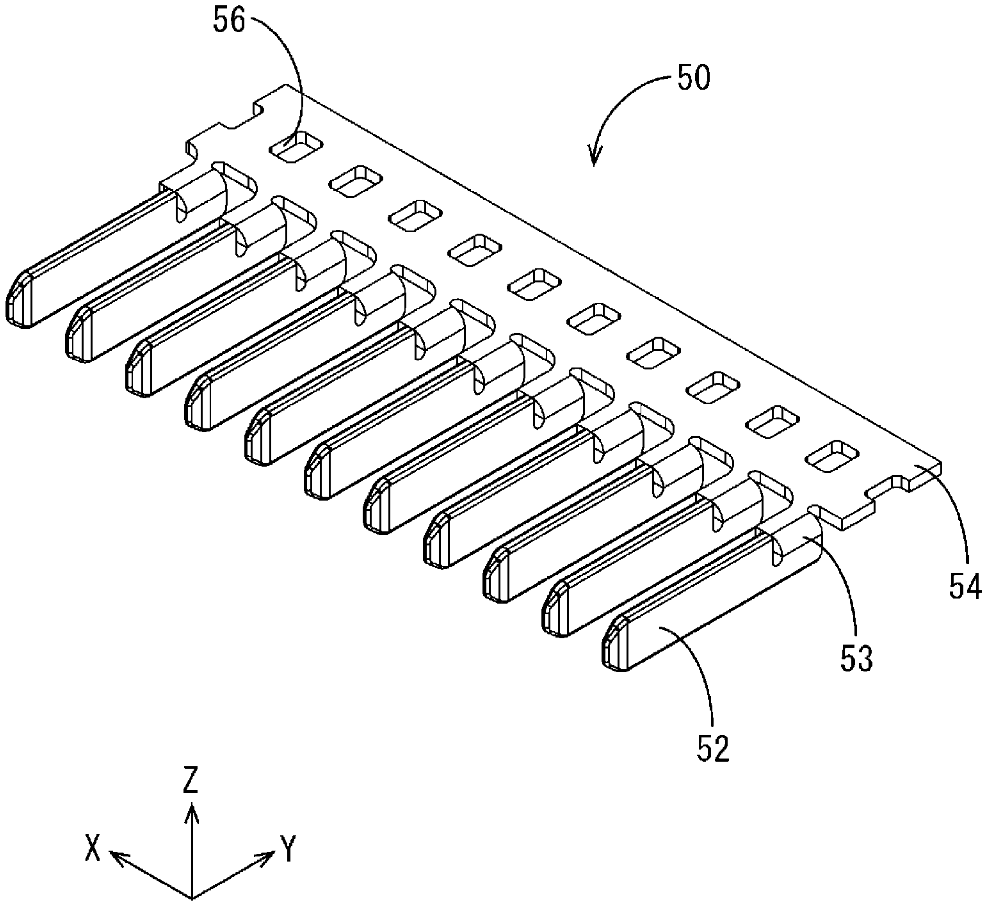
FIG. 17 is a perspective view of a busbar.

The busbar 50 is formed by press-working a metal plate material into a predetermined shape. An arbitrary metal such as copper and copper alloy can be appropriately selected as the metal plate material. As shown in FIG. 17, the busbar 50 includes a plurality of tabs 52 extending rearward and a coupling portion 54 coupling front end parts of the tabs 52 via relay portions 53. The tab 52 is in the form of a plate flat in the lateral direction. The coupling portion 54 is in the form of a plate flat in the vertical direction. The relay portion 53 is formed to extend rearward from the coupling portion 54.

[Terminal 12]

Figure 16:
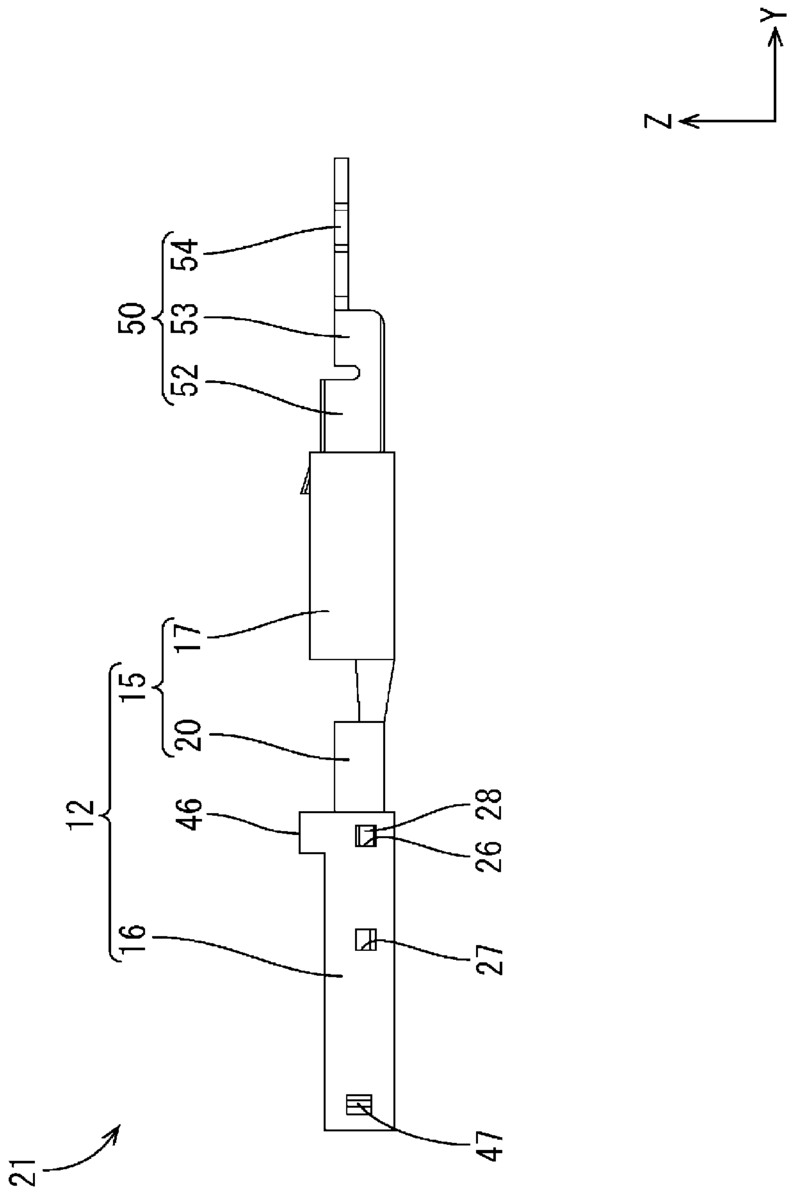
FIG. 16 is a side view of a connecting member.

As shown in FIG. 16, the terminal 12 includes a terminal body 15 made of metal and a slide portion 16 relatively slidable with respect to the terminal body 15.

[Terminal Body 15]

The terminal body 15 is formed into a predetermined shape by a method such as press working, cutting and casting. An arbitrary metal such as copper, copper alloy, aluminum, aluminum alloy and stainless steel can be appropriately selected as a metal constituting the terminal body 15 if necessary. The terminal body 15 according to this embodiment is made of copper or copper alloy. A plating layer may be formed on the surface of the terminal body 15. An arbitrary metal such as tin, nickel and silver can be appropriately selected as a metal constituting the plating layer if necessary. Tin plating is applied to the terminal body 15 according to this embodiment.

Figure 13:
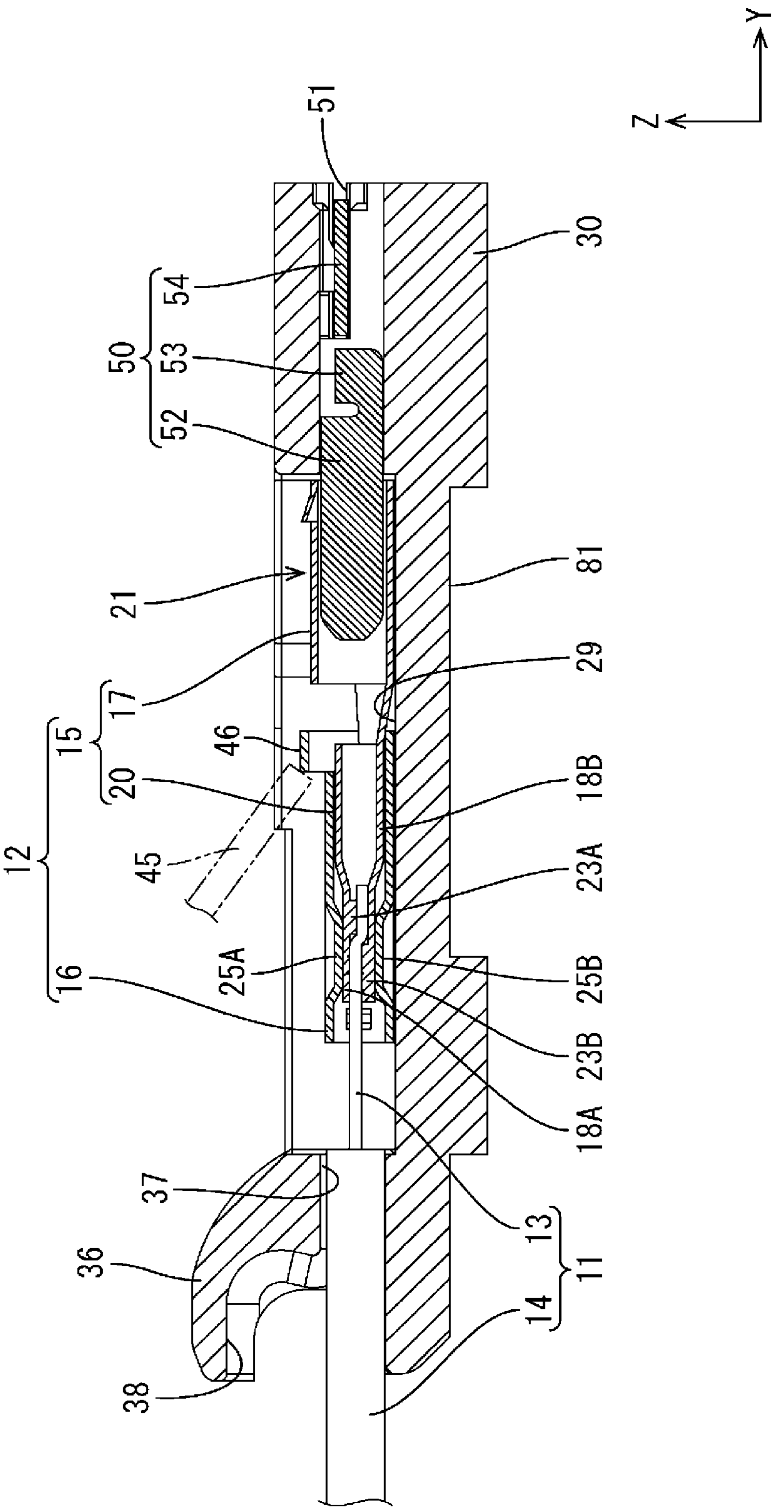
FIG. 13 is a section showing the assembling process of the first housing.

The terminal body 15 includes a tube portion 17, into which the tab 52 is insertable, and a wire connecting portion 20 located behind the tube portion 17 to be connected to the wire 11. As shown in FIGS. 12 and 13, the wire connecting portion 20 includes an upper sandwiching portion 18A (an example of a sandwiching portion) and a lower sandwiching portion 18B (an example of the sandwiching portion) extending rearward. The tube portion 17 is in the form of a rectangular tube extending in the front-rear direction. The front end of the tube portion 17 is open, so that the tab 52 is insertable.

As shown in FIG. 11, a resiliently deformable resilient contact piece 19 is disposed inside the tube portion 17. The resilient contact piece 19 extends inward from an inner wall of the tube portion 17. The tab 52 inserted into the tube portion 17 presses and resiliently deforms the resilient contact piece 19. The tab 52 is sandwiched between the inner wall of the tube portion 17 and the resilient contact piece 19 by a resilient force of the resiliently deformed resilient contact piece 19. In this way, the tab 52 and the terminal 12 are electrically connected.

As shown in FIG. 12, an upper holding protrusion 23A (an example of a wire connecting portion) projecting downward is provided at a position forward of a rear end part on the lower surface of the upper sandwiching portion 18A. A lower holding protrusion 23B (an example of the wire connecting portion) projecting upward is provided on a rear end part of the upper surface of the lower sandwiching portion 18B. The lower and upper holding protrusions 23B, 23A are provided at positions shifted in the front-rear direction.

The lower surface of the upper sandwiching portion 18A and the upper surface of the lower sandwiching portion 18B bite into an oxide film formed on the surface of the core 13 to strip the oxide film, whereby a metal surface of the core 13 is exposed. The core 13 and the terminal body 15 are electrically connected by the contact of this metal surface and the upper and lower sandwiching portions 18A, 18B.

[Slide Portions 16]

As shown in FIG. 16, the slide portion 16 is in the form of a rectangular tube extending in the front-rear direction. The slide portion 16 is formed by a known method such as cutting, casting or press working if necessary. An arbitrary metal such as copper, copper alloy, aluminum, aluminum alloy and stainless steel can be appropriately selected as a metal constituting the slide portion 16 if necessary. The slide portion 16 according to this embodiment is made of stainless steel. A plating layer may be formed on the surface of the slide portion 16. An arbitrary metal such as tin, nickel and silver can be appropriately selected as a metal constituting the plating layer if necessary.

As shown in FIG. 12, an inner cross-sectional shape of the slide portion 16 is the same as or somewhat larger than an outer cross-sectional shape of a region of the terminal body 15 where the upper and lower sandwiching portions 18A, 18B are provided. In this way, the slide portion 16 is disposed outside the region of the terminal body 15 where the upper and lower sandwiching portions 18A, 18B are provided and accommodates these inside.

As shown in FIGS. 12 and 13, an upper pressurizing portion 25A (an example of a pressurizing portion) projecting downward is provided on the lower surface of the upper wall of the slide portion 16. A lower pressurizing portion 25A (an example of the pressurizing portion) projecting upward is provided on the upper surface of the lower wall of the slide portion 16.

As shown in FIG. 16, a partial lock receiving portion 26 is open at a position near a front end part in the front-rear direction in a side wall of the slide portion 16. Further, a full lock receiving portion 27 is open at a position behind the partial lock receiving portion 26 in the side wall of the slide portion 16. The partial lock receiving portion 26 and the full lock receiving portion 27 are resiliently lockable to a locking projection 28 provided on a side wall of the terminal body 15.

With the locking projection 28 of the terminal body 15 and the partial lock receiving portion 26 of the slide portion 16 locked (state shown in FIG. 12), the slide portion 16 is held at a partial locking position with respect to the terminal body 15. In this state, the upper and lower pressurizing portions 25A, 25B of the slide portion 16 are separated rearward from the rear end edges of the upper and lower sandwiching portions 18A, 18B of the terminal body 15. Further, in this state, a distance between the upper and lower sandwiching portions 18A, 18B is set larger than a diameter of the core 13.

With the locking projection 28 of the terminal body 15 and the full lock receiving portion 27 of the slide portion 16 locked (state shown in FIG. 13), the slide portion 16 is held at a full locking position with respect to the terminal body 15. In this state, the upper pressurizing portion 25A of the slide portion 16 is in contact with the upper sandwiching portion 18A from above the upper sandwiching portion 18A. Further, the lower pressurizing portion 25B of the slide portion 16 is in contact with the lower sandwiching portion 18B from below the lower sandwiching portion 18B.

As described above, the slide portion 16 is slidable between the partial locking position and the full locking position described above while being externally fit to the region of the terminal body 15 where the upper and lower sandwiching portions 18A, 18B are provided.

As shown in FIG. 13, with the slide portion 16 held at the full locking position with respect to the terminal body 15, the upper pressurizing portion 25A presses the upper sandwiching portion 18A from above, whereby the upper sandwiching portion 18A is deformed downward. Further, the lower pressurizing portion 25B presses the lower sandwiching portion 18B from below, whereby the lower sandwiching portion 18B is deformed upward. In this way, the core 13 is disposed to extend in the front-rear direction (extending direction) in a space between the upper and lower sandwiching portions 18A, 18B and the core 13 is vertically sandwiched by the resiliently deformed upper and lower sandwiching portions 18A, 18B with the slide portion 16 held at the full locking position with respect to the terminal body 15. That is, the upper sandwiching portion 18A contacts the core 13 from above by being pressed downward by the upper pressurizing portion 25A, and the lower sandwiching portion 18B contacts the core 13 from below by being pressed upward by the lower pressurizing portion 25B.

With the slide portion 16 held at the full locking position with respect to the terminal body 15, the upper holding protrusion 23A of the upper sandwiching portion 18A presses the core 13 from above and the lower holding protrusion 23B of the lower sandwiching portion 18B presses the core 13 from below. As just described, the core 13 is held in a state bent in the vertical direction by being pressed from above by the upper holding protrusion 23A and pressed from below by the lower holding protrusion 23B disposed at the position shifted in the front-rear direction from the upper holding protrusion 23A. Further, the core 13 and the terminal 12 are electrically connected also by the upper and lower holding protrusions 23A, 23B.

As shown in FIG. 13, a front end part of the slide portion 16 is provided with a jig contact portion 46 projecting upward from the upper wall. A jig 45 contacts the jig contact portion 46 from behind and the slide portion 16 is pushed forward by this jig 45, whereby the slide portion 16 is movable forward.

As shown in FIG. 15, with the upper cover 60 assembled with the lower housing 30 at the closed position, the wires 11 are sandwiched between the upper surface of the upper guide portion 69 of the upper cover 60 and the lower surface of the lower guide portion 36 of the lower housing 30, thereby being held in a crank shape in a side view.

[Fixing Member 72]

Figure 2:
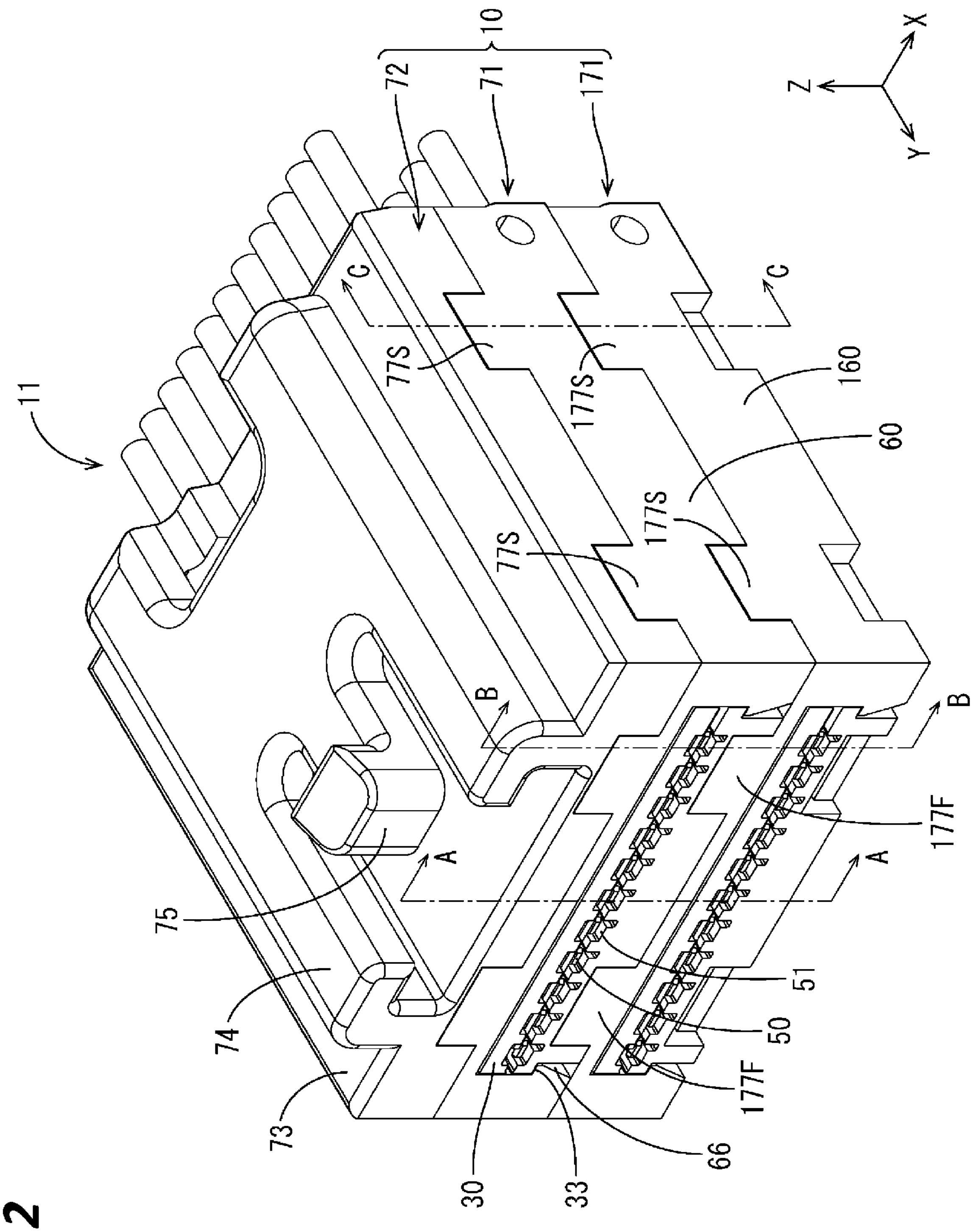
FIG. 2 is a front perspective view of the joint connector.

The fixing member 72 is a member to be fixed to a mating member 100 such as a bracket and formed by injection molding a material containing an insulting synthetic resin. As shown in FIGS. 1 and 2, the fixing member 72 includes a body portion 73 and a mounting portion 74.

The body portion 73 extends in the front-rear direction and has a vertically flat shape. The mounting portion 74 is provided atop the body portion 73 and gate-shaped when viewed from front. A lock arm 75 projecting forward and to be locked to the mating member 100 (shown in FIG. 3) is provided in a center of the mounting portion 74.

[First Stacked State Holding Portion 22A]

As shown in FIGS. 3 to 5, the first stacked state holding portion 22A is for holding the first housing 71 and the second housing 171 in a stacked state and includes a first locking structure part 82 (shown in FIG. 4), a second locking structure part 83 (shown in FIG. 5) and mating portions 84 (shown in FIG. 3).

[First Locking Structure Part 82]

As shown in FIG. 4, the first locking structure part 82 is for locking the lower housing 30 in the first housing 71 and an upper cover 160 (examples of a lid portion, a second lid portion) in the second housing 171 to each other. The first locking structure part 82 includes lock recesses 76F provided in the lower housing 30 and lock portions 177F provided on the upper cover 160.

As shown in FIG. 9, two lock recesses 76F are provided below the busbar insertion hole 51 in the front wall of the lower housing 30 while being spaced apart in the lateral direction. As shown in FIG. 4, a locked wall 79F is provided inside the lock recess 76F.

As shown in FIG. 4, the lock portion 177F is cantilevered upward (i.e. toward the first housing 71) from a front end part of the upper wall of the upper cover 160. As shown in FIG. 2, two lock portions 177F are provided while being spaced apart in the lateral direction. As shown in FIG. 4, a lock projection 178F projecting rearward is provided on a tip part of the lock portion 177F.

When the first housing 71 is stacked on the second housing 171, the lock portions 177F are deflected, whereby the lock projections 178 enter the lock recesses 76F. At this time, the lock projections 178F are located to be able to contact the locked walls 79F of the lock recesses 76F from above. In this way, if the first housing 71 is going to be displaced upward, the locked walls 79F contact the lock projections 178F from below. Thus, the lower housing 30 in the first housing 71 and the upper cover 160 in the second housing 171 are locked to each other. Therefore, an upward displacement of the first housing 71 can be suppressed and the stacked state of the first and second housings 71, 171 can be held.

[Second Locking Structure Part 83]

As shown in FIG. 5, the second locking structure part 83 is for locking the upper cover 60 in the first housing 71 and the upper cover 160 in the second housing 171 to each other. The second locking structure part 83 includes lock recesses 76S provided in both side walls of the upper cover 60 and lock portions 177S provided on both left and right end parts of the upper wall of the upper cover 160. Further, as shown in FIGS. 1 and 2, two lock portions 177S are provided on each of both left and right sides while being spaced apart in the front-rear direction. Note that as many lock recesses 76S as the lock portions 177S are provided to correspond.

As shown in FIG. 5, a locked wall 79S is provided inside the lock recess 76S, similarly to the lock recess 76F. The lock portion 177S is cantilevered upward (i.e. toward the first housing 71) from the upper wall of the upper cover 160 and a lock projection 178S projecting inward is provided on a tip part of the lock portion 177S.

When the first housing 71 is stacked on the second housing 171, the lock projections 178S enter the lock recesses 76S. In this way, if the first housing 71 is going to be displaced upward, the locked walls 79S contact the lock projections 178S from below. Thus, the upper cover 60 in the first housing 71 and the upper cover 160 in the second housing 171 are locked to each other. Therefore, an upward displacement of the first housing 71 can be suppressed and the stacked state of the first and second housings 71, 171 can be held.

[Mating Portions 84]

As shown in FIG. 3, the lower surface of the lower housing 30 in the first housing 71 and the upper surface of the upper cover 160 in the second housing 171 serve as facing wall portions 85A, 85B facing each other. The mating portions 84 are provided on the respective facing wall portions 85A, 85B and include a mating recess 81 (an example of a first fitting portion) in the form of a groove open in the facing wall portion 85A of the first housing 71 and a mating projection 180 (an example of a second fitting portion) projecting upward from the facing wall portion 85B of the second housing 171.

When the first housing 71 is stacked on the second housing 171, the mating recess 81 and the mating projection 180 are fit. In this way, the first housing 71 is suppressed from being displaced in the front-rear direction and lateral direction (examples of a direction intersecting the stacking direction). Further, since the first housing 71 can be positioned when being stacked on the second housing 171 by providing the mating portion 84, assembling workability can be improved.

[Second Stacked State Holding Portion 22B]

As shown in FIGS. 3 to 5, the first stacked state holding portion 22B is for holding the fixing member 72 and the first housing 71 in a stacked state and includes a first locking structure part 182 (shown in FIG. 4), a second locking structure part 183 (shown in FIG. 5) and mating portions 184 (shown in FIG. 3).

[First Locking Structure Part 182]

As shown in FIG. 4, the first locking structure part 182 includes lock recesses 276F provided in the front wall of the fixing member 72 and lock portions 77F cantilevered upward (i.e. toward the fixing member 72) from a front end part of the upper wall of the upper cover 60 in the first housing 71. The fixing member 72 and the upper cover 60 are locked to each other by the first locking structure part 182. Note that a locking structure of the first locking structure part 182 is not described in detail since being similar to that of the first locking structure part 82 described above.

[Second Locking Structure Part 183]

As shown in FIG. 5, the second locking structure part 183 includes lock recesses 276S provided in both left and right side walls of the body portion 73 of the fixing member 72 and lock portions 77S provided on both left and right end parts of the upper wall of the upper cover 60 in the first housing 71. The lock portion 77S is cantilevered upward (i.e. toward the fixing member 72) from the upper wall of the upper cover 60 and includes a lock projection 78S. The fixing member 72 and the upper cover 60 are locked to each other by the second locking structure part 183. Note that a locking structure of the second locking structure part 183 is not described in detail since being similar to that of the second locking structure part 83 described above.

[Mating Portions 184]

As shown in FIG. 3, the lower surface of the body portion 73 in the fixing member 72 and the upper surface of the upper cover 60 in the first housing 71 serve as facing wall portions 185A, 185B facing each other. The mating portions 184 are provided on the respective facing wall portions 185A, 185B and include a mating recess 281 (an example of the first fitting portion) in the form of a groove open in the facing wall portion 185A of the fixing member 72 and a mating projection 80 (an example of the second fitting portion) projecting upward from the facing wall portion 185B of the first housing 71. When the fixing member 72 is stacked on the first housing 71, the mating recess 281 and the mating projection 80 are fit. In this way, similarly to the aforementioned mating portions 84, an effect of suppressing displacements of the fixing member 72 in the front-rear direction and lateral direction and improving the assembling workability of the fixing member 72 is achieved.

[Assembling Process of Joint Connector 10]

An example of an assembling process of the joint connector 10 according to this embodiment is described below. First, an assembling process of the first housing 71 is described.

The terminal body 15 and the slide portion 16 are formed by a known method. The slide portion 16 is assembled with the terminal body 15 from front. The front end edge of the slide portion 16 comes into contact with the locking projection 28 of the terminal body 15 from behind, whereby the side wall of the slide portion 16 is deformed to expand. If the slide portion 16 is further pushed forward, the side wall of the slide portion 16 is restored and the partial lock receiving portion 26 of the slide portion 16 is locked to the locking projection 28 of the terminal body 15. In this way, the slide portion 16 is held at the partial locking position with respect to the terminal body 15. In this way, the terminal 12 is obtained.

The lower housing 30 and the upper cover 60 are formed by injection molding the synthetic resin.

The terminals 12 having the slide portions 16 held at the partial locking position with respect to the terminal bodies 15 are inserted into the cavities 29 of the lower housing 30 from above. Rear end parts of the slide portions 16 are located in front of the rear wall of the lower housing 30, and front end parts of the tube portions 17 of the terminal bodies 15 are located behind the front wall of the lower housing 30. In this way, the terminals 12 are held in the cavities 29 while being positioned in the front-rear direction.

As shown in FIG. 12, the busbar 50 is inserted into the busbar insertion hole 51 of the lower housing 30 from front. As shown in FIG. 11, the busbar 50 is retained and held in the lower housing 30 by inserting the busbar locking claws 51C provided in the busbar insertion hole 51 of the lower housing 30 into the locking holes 56 of the busbar 50. The tabs 52 of the busbar 50 are inserted into the tube portions 17 of the terminals 12. The tabs 52 and the terminals 12 are electrically connected by the contact of the tabs 52 and the resilient contact pieces 19. In this way, the plurality of terminals 12 are electrically connected via the busbar 50.

The core 13 of the wire 11 is exposed by stripping the insulation coating 14 by a known method. As shown in FIG. 12, the wire 11 is inserted into the wire insertion hole 37 of the lower housing 30 from behind with the core 13 in the lead. Since the cavity 29 is located in front of each wire insertion hole 37, the wire 11 inserted into the wire insertion hole 37 enters the cavity 29. If the wire 11 is further pushed forward, a front end part of the core 13 is introduced into the slide portion 16 through a rear end part of the slide portion 16.

Subsequently, as shown in FIG. 13, the jig 45 is brought into contact with the jig contact portion 46 from behind to slide the slide portion 16 forward. The slide portion 16 is moved relatively forward with respect to the terminal body 15. At this time, the locking projection 28 of the terminal body 15 and the partial lock receiving portion 26 (shown in FIG. 16) of the slide portion 16 are disengaged and the side wall of the slide portion 16 rides on the locking projection 28 to be deformed and expanded.

When the slide portion 16 is moved forward, the side wall of the slide portion 16 is restored and the locking projection 28 of the terminal body 15 and the full lock receiving portion 27 of the slide portion 16 are resiliently locked. In this way, the slide portion 16 is held at the full locking position with respect to the terminal body 15.

With the slide portion 16 held at the full locking position with respect to the terminal body 15, the upper pressurizing portion 25A of the slide portion 16 comes into contact with the upper sandwiching portion 18A of the terminal body 15 from above to press the upper sandwiching portion 18A downward. Further, the lower pressurizing portion 25B of the slide portion 16 comes into contact with the lower sandwiching portion 18B of the terminal body 15 from below to press the lower sandwiching portion 18B upward. In this way, as shown in FIG. 13, the core 13 is vertically sandwiched by the upper and lower sandwiching portions 18A, 18B.

The core 13 is sandwiched by the lower surface of the upper sandwiching portion 18A and the upper surface of the lower sandwiching portion 18B, whereby the oxide film formed on the surface of the core 13 is stripped to expose the metal surface constituting the core 13. The wire 11 and the terminal 12 are electrically connected by the contact of this metal surface and the upper and lower sandwiching portions 18A, 18B. In this way, the plurality of wires 11 are electrically connected via the terminals 12 and the busbar 50.

With the core 13 vertically sandwiched by the upper and lower sandwiching portions 18A, 18B, the core 13 is sandwiched by the upper holding protrusion 23A of the upper sandwiching portion 18A and the lower holding protrusion 23B of the lower sandwiching portion 18B, thereby extending in the front-rear direction and being held in the state bent in the vertical direction. In this way, the core 13 can be firmly held, wherefore a holding force of the wire 11 and the terminal 12 can be enhanced when a pulling force is applied to the wire 11.

Figure 14:
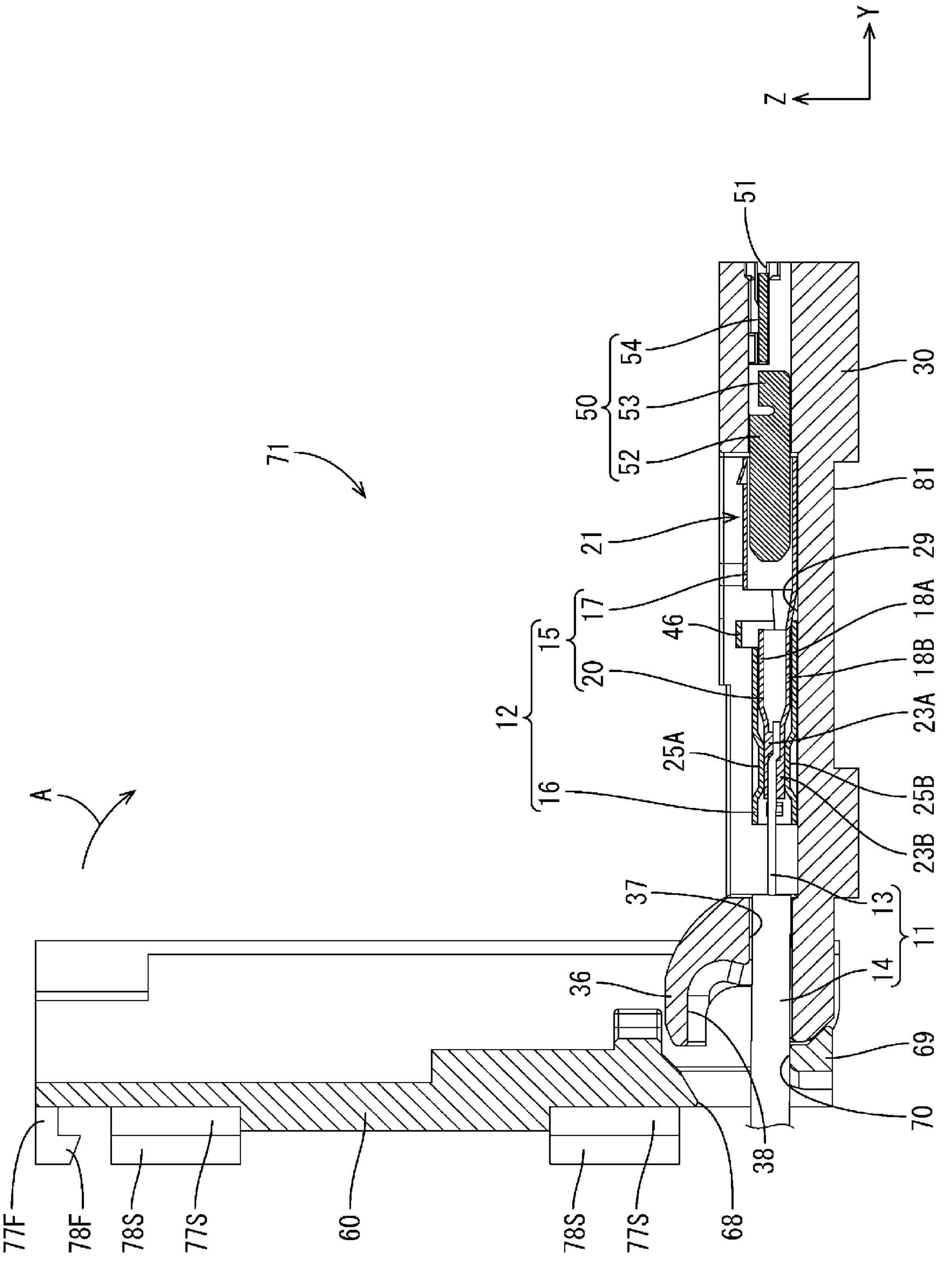
FIG. 14 is a section showing the assembling process of the first housing.

As shown in FIG. 14, the upper cover 60 is assembled with the lower housing 30. At this time, the upper cover 60 is so assembled with the lower housing 30 from behind that the wires 11 are inserted into the opening 68 of the upper cover 60 with the upper cover 60 held in a posture intersecting the lower housing 30. At this time, as shown in FIGS. 9 and 10, the shaft portions 35 of the lower housing 30 are fit into the shaft holes 67 of the upper cover 60. In this way, the upper cover 60 is assembled with the lower housing 30 at the open position (position shown in FIG. 10).

As shown in FIG. 14, the upper cover 60 is rotated in a clockwise direction (direction indicated by an arrow A) in FIG. 14 with the shaft portions 35 as an axis of rotation. Then, the upper contact portion 70 of the upper guide portion 69 of the upper cover 60 contacts the wires 11, whereby the wires 11 are bent.

If the upper cover 60 is further rotated to reach the closed position (position shown in FIG. 15), the lock claws 66 of the upper cover 60 are resiliently engaged with the lock receiving portions 33 provided in the side walls of the lower housing 30, whereby the lower housing 30 and the upper cover 60 are integrally assembled.

The wires 11 are held in the crank shape by being sandwiched between the lower guide portion 36 of the lower housing 30 and the upper guide portion 69 of the upper cover 60. Even if the wires 11 move in the front-rear direction by being sandwiched between the lower guide portion 36 and the upper guide portion 69, the wires 11 and the busbar 50 move in the front-rear direction together with the terminals 12 since a clearance is provided. In this way, the application of a force to the busbar 50 and the terminals 12 is suppressed. In the above way, the first housing 71 is assembled.

An assembling process of the second housing 171 is not described since being the same as the assembling process of the first housing 71.

Subsequently, the first housing 71 is stacked atop the second housing 171 and the fixing member 72 is stacked atop the first housing 71. In the above way, the joint connector 10 is completed.

Functions and Effects of Embodiment

According to this embodiment, by providing the first stacked state holding portion 22A for holding the upper cover 60 of the first housing 71 and the upper cover 160 of the second housing 171 in the stacked state, the upper cover 60 is not detached and the first and second housings 71, 171 can be held in the stacked state since the upper covers 60, 160 are held by the first stacked state holding portion 22A even if a stress is applied to the upper cover 60 of the first housing 71 as compared to a configuration in which only the upper cover 160 of the second housing 171 and the lower housing 30 of the first housing 71 are provided with a stacked state holding portion, for example, in the case of stacking the first housing 71 on the second housing 171.

Further, since the first housing 71 can be held stacked on the second housing 171, the respective housings 71, 171 in the joint connector 10 can be collectively fixed by one taping, for example, in the case of fixing the joint connector 10 to a harness by a harness tape as compared to a configuration in which first and second housings are not stacked.

Further, when the fixing member 72 is mounted on the first housing 71 and fixed to the mating member 100, the joint connector 10 can be fixed to the mating member 100 by one fixing member 72. Therefore, the joint connector 10 can be fixed using a small number of types of components as compared to a configuration in which each of first and second housings is provided with a fixing member.

Further, the upper cover 60 includes the upper guide portion 69 for bending the wires 11 extending in the first direction D1 from between the upper and lower holding protrusions 23A, 23B of the terminals 12 to extend in the second direction D2 shifted from the first direction D1 and drawing out the wires 11 to the outside of the first housing 71.

By providing the upper cover 60 with the upper guide portion 69 for bending the wires 11, the wires 11 can be bent and drawn out and a holding force for the wires 11 can be strengthened.

Further, the upper cover 60 is mounted on the lower housing 30 from one side in the stacking direction, and the upper cover 60 is provided with the lock claws 66 for suppressing a displacement of the upper cover 60 in a direction away from the lower housing 30 by contacting the lock receiving portions 33 of the lower housing 30 from the other side in the stacking direction.

By providing the upper cover 60 with the lock claws 66 and providing the lower housing 30 with the lock receiving portions 33, the detachment of the upper cover 60 from the lower housing 30 can be suppressed.

Further, the first stacked state holding portion 22A is provided with the lock portions 177S including the lock projections 178S and cantilevered toward the upper cover 60 from the upper cover 160, and the lock recesses 76S provided in the upper cover 60 and to be fit to the lock projections 178S, and the first and second housings 71, 171 are held in the stacked state by fitting the lock projections 178S and the lock recesses 76S.

The first and second housings 71, 171 can be held in the stacked state by providing the upper cover 160 with the lock portions 177S including the lock projections 178S and providing the upper cover 60 with the lock recesses 76S to be fit to the lock projections 178S.

Further, the first stacked state holding portion 22A is provided with the lock portions 177F including the lock projections 178F and extending from the upper cover 160 toward the lower housing 30 in the first housing 71 and the lock recesses 76F provided in the lower housing 30 of the first housing 71 and to be fit to the lock projections 178F, and the first and second housings 71, 171 can be held in the stacked state by fitting lock projections 178F and the lock recesses 76F.

The stacked state of the first and second housings 71, 171 is held not only between the upper covers 60 and 160, but also between the lower housing 30 and the upper cover 160 by providing the upper cover 160 with the lock portions 177F including the lock projections 178F and providing the lower housing 30 with the lock recesses 76F to be fit to the lock projections 178F. In this way, a holding force for holding the first and second housings 71, 171 in the stacked state can be further strengthened.

Further, the first and second housings 71, 171 include the facing wall portions 85A, 85B facing each other, the mating recess 81 is provided in the facing wall portion 85A of the first housing 71, the mating projection 180 to be fit to the mating recess 81 is provided on the facing wall portion 85B of the second housing 171, and the first and second housings 71, 171 are suppressed from being displaced in a direction intersecting the stacking direction by fitting the mating recess 81 and the mating projection 180.

The first and second housings 71, 171 can be suppressed from being displaced in the direction intersecting the stacking direction by respectively providing the facing wall portions 85A, 85B of the first and second housings 71, 171 with the mating recess 81 and the mating projection 180.

Further, the fixing member 72 to be fixed to the mating member 100 is provided, the fixing member 72 is stacked on the upper cover 60, the second stacked state holding portion 22B is provided with the lock portions 77F including the lock projections 78F and extending from the upper cover 60 to the fixing member 72 and the lock recesses 276F provided in the fixing member 72 and to be fit to the lock projections 78F, and the fixing member 72 and the first housing 71 are held in the stacked state by fitting the lock projections 78F and the lock recesses 276F.

Since the fixing member 72 to be fixed to the mating member 100 is stacked and held on the upper cover 60, the joint connector 10 can be fixed to the mating member 100 by one fixing member 72.

Further, the fixing member 72 and the first housing 71 include the facing wall portions 185A, 185B facing each other, the second stacked state holding portion 22B is provided with the mating recess 281 provided in the facing wall portion 185A of the fixing member 72 and the mating projection 80 provided on the facing wall portion 185B of the first housing 71 and to be fit to the mating recess 281, and the fixing member 72 is suppressed from being displaced with respect to the first housing 71 in a direction intersecting the stacking direction of the fixing member 72 and the first housing 71 by fitting the mating recess 281 and the mating projection 80.

The fixing member 72 can be suppressed from being displaced in the direction intersecting the stacking direction with respect to the first housing 71 by respectively providing the facing wall portions 185A, 185B of the fixing member 72 and the first housing 71 with the mating recess 281 and the mating projection 80.

Further, the terminal 12 is provided with the terminal body 15 including the sandwiching portions (upper sandwiching portion 18A, lower sandwiching portion 18B) for sandwiching the wire 11, the slide portion 16 slidable with respect to the terminal body 15 along the front-rear direction, which is an extending direction of the wire 11, and the holding protrusions 23A, 23B to be connected to the wire 11, the slide portion 16 includes the pressurizing portions (upper pressurizing portion 25A, lower pressurizing portion 25B) for pressurizing the sandwiching portions toward the wire 11, and the sandwiching portions include the holding protrusions (upper holding protrusion 23A, lower holding protrusion 23B) projecting toward the wire 11 and configured to contact the wire 11.

For example, since the terminal 12 can be connected to the wire 11 even if the wire 11 is a very thin single-core wire, the terminal 12 can be reduced in size in accordance with the size of the wire 11. The use of the terminals 12 having such a configuration can contribute to a size reduction of the joint connector 10.

Other Embodiments

The present disclosure is not limited to the above described and illustrated embodiment. For example, the following embodiments are also included in the technical scope of the technique disclosed in this specification.

(1) Although the joint connector 10 is fixed to the mating member 100 by the fixing member 72 in the above embodiment, there is no limitation to this. For example, a joint connector may include no fixing member and may be fixed to a harness by taping.

(2) Although two lock portions 77F of the first housing 71 are provided on the front end part of the upper all of the upper cover 60 in the above embodiment, there is no limitation to this. For example, one lock portion may be provided on a front end part of the upper wall of a housing. A similar configuration may also be applied to the second housing 171.

(3) Although two lock portions 77S of the first housing 71 are provided on each of both side parts of the upper wall, there is no limitation to this. For example, one lock portion may be provided on each of both side parts of the upper wall of a first housing. A similar configuration may also be applied to the second housing 171.

(4) Although the joint connector 10 includes two housings, i.e. the first and second housings 71, 171, in the above embodiment, there is no limitation to this. For example, a joint connector may include three or more housings.

(5) Although the slide portion 16 has a rectangular tube shape in the above embodiment, there is no limitation to this. For example, a slide portion may have a polygonal tube shape such as a triangular tube shape or a hexagonal tube shape or a hollow cylindrical shape.

(6) Although the first fitting portion is the mating recess 81, 281 and the second fitting portion is the mating projection 80, 180 in the above embodiment, there is no limitation to this. For example, conversely, the first fitting portion may be a mating projection and the second fitting portion may be a mating recess.

LIST OF REFERENCE NUMERALS

10: joint connector
11: wire
12: terminal
13: core
14: insulation coating
15: terminal body
16: slide portion
17: tube portion
18A: upper sandwiching portion
18B: lower sandwiching portion
19: resilient contact piece
20: wire connecting portion
21: connecting member
22A: first stacked state holding portion (stacked state holding portion)
22B: second stacked state holding portion (stacked state holding portion)
23A: upper holding protrusion (wire connecting portion)
23B: lower holding protrusion (wire connecting portion)
25A: upper pressurizing portion
25B: lower pressurizing portion
26: partial lock receiving portion
27 full lock receiving portion
28: locking projection
29: cavity
30: lower housing (placing portion)
31: partition wall
33 lock receiving portion (locked portion)
35: shaft portion
36: lower guide portion
37: wire insertion hole
38: lower contact portion
45: jig
46 jig contact portion
50: busbar (conductive member)
51: busbar insertion hole
51C: busbar locking claw
52: tab
53: relay portion
54: coupling portion
56: locking hole
60, 160: upper cover (lid portion, first lid portion, second lid portion)
66: lock claw (locking portion)
67: shaft hole
68: opening
69: upper guide portion (bending/drawing-out portion)
70: upper contact portion
71, 171: housing
72: fixing member
73: body portion
74 mounting portion
75: lock arm
76F, 76S, 276F, 276S: lock recess
77F, 77S, 177F, 177S: lock portion
78, 78S, 178F, 178S: lock projection
79F, 79S: locked wall
80, 180: mating projection (second fitting portion)
81,281: mating recess (first fitting portion)
82, 182: first locking structure part
83, 183: second locking structure part
84, 184: mating portion
85A, 85B, 185A, 185B 85, 85A, 85B, 185, 185A, 185B: facing wall portion
100: mating member

What is claimed is:

1. A joint connector, comprising:

connecting members each including a plurality of terminals to be connected to wires and a conductive member for making the plurality of terminals conductive with each other; and a plurality of housings for respectively accommodating the connecting members, wherein:

the plurality of housings are stacked along a stacking direction, at least one housing constituting the plurality of housings includes:

a placing portion, the connecting member being placed on the placing portion; and a lid portion for at least partially covering the connecting member placed on the placing portion to hold the connecting member in the housing, a first housing serving as one of the housings and a second housing serving as one of the housings are stacked on each other, and a first lid portion serving as the lid portion relating to the first housing and a second lid portion serving as the lid portion relating to the second housing are provided with a stacked state holding portion for holding a stacked state of the first and second housings.

2. The joint connector of claim 1, wherein:

the terminal includes a wire connecting portion to be connected to the wire, and the lid portion includes a bending/drawing-out portion for bending the wires extending in a first direction from the wire connecting portions of the terminals to extend in a second direction shifted from the first direction and drawing out the wires to outside of the housing.

3. The joint connector of claim 1, wherein:

the lid portion is mounted on the placing portion from one side in the stacking direction, and the lid portion is provided with a locking portion for suppressing a displacement of the lid portion in a direction away from the placing portion by contacting a locked portion of the placing portion from the other side in the stacking direction.

4. The joint connector of claim 1, wherein:

the stacked state holding portion includes:

a lock portion having a lock projection and extending from the second lid portion toward the first lid portion; and a lock recess provided in the first lid portion and to be fit to the lock projection, and the first and second housings are held in the stacked state by fitting the lock projection and the lock recess.

5. The joint connector of claim 1, wherein:

the stacked state holding portion includes:

a lock portion having a lock projection and extending from the second lid portion toward the placing portion relating to the first housing; and a lock recess provided in the placing portion relating to the first housing and to be fit to the lock projection, and the first and second housings are held in the stacked state by fitting the lock projection and the lock recess.

6. The joint connector of claim 1, wherein:

the first and second housings include facing wall portions facing each other, the stacked state holding portion includes:

a first fitting portion provided on the facing wall portion of the first housing; and a second fitting portion provided on the facing wall portion of the second housing and to be fit to the first fitting portion, and the first housing is suppressed from being displaced in a direction intersecting the stacking direction with respect to the second housing by fitting the first and second fitting portions.

7. The joint connector of claim 1, comprising a fixing member to be fixed to a mating member and stacked on the first lid portion, wherein:

the stacked state holding portion includes:

a lock portion having a lock projection and extending from the first lid portion to the fixing member; and a lock recess provided in the fixing member and to be fit to the lock projection, and the fixing member and the first housing are held in a stacked state by fitting the lock projection and the lock recess.

8. The joint connector of claim 7, wherein:

the fixing member and the first housing include facing wall portions facing each other, the stacked state holding portion includes:

a first fitting portion provided on the facing wall portion of the fixing member; and a second fitting portion provided on the facing wall portion of the first housing and to be fit to the first fitting portion, the fixing member is suppressed from being displaced in a direction intersecting a stacking direction of the fixing member and the first housing with respect to the first housing by fitting the first and second fitting portions.

9. The joint connector of claim 1, wherein:

the terminal includes:

a terminal body having a sandwiching portion for sandwiching the wire;

a slide portion slidable with respect to the terminal body along an extending direction of the wire; and a wire connecting portion to be connected to the wire, the slide portion includes a pressurizing portion for pressurizing the sandwiching portion toward the wire, and the wire connecting portion projects from the sandwiching portion toward the wire and contacts the wire to be connected.

* * * * *